United States Patent
Karl

(10) Patent No.: US 11,985,153 B2
(45) Date of Patent: May 14, 2024

(54) SYSTEM AND METHOD FOR DETECTING ANOMALOUS ACTIVITY BASED ON A DATA DISTRIBUTION

(71) Applicant: The Toronto-Dominion Bank, Toronto (CA)

(72) Inventor: Moshe Karl, Petah Tikva (IL)

(73) Assignee: The Toronto-Dominion Bank, Toronto (CA)

( * ) Notice: Subject to any disclaimer, the term of this patent is extended or adjusted under 35 U.S.C. 154(b) by 363 days.

(21) Appl. No.: 17/482,059

(22) Filed: Sep. 22, 2021

(65) Prior Publication Data

US 2023/0093540 A1    Mar. 23, 2023

(51) Int. Cl.
| | | |
|---|---|---|
| G06F 11/00 | (2006.01) | |
| G06F 7/04 | (2006.01) | |
| G06F 12/14 | (2006.01) | |
| G06F 12/16 | (2006.01) | |
| G06F 16/28 | (2019.01) | |
| H04L 9/40 | (2022.01) | |
| H04N 7/16 | (2011.01) | |

(52) U.S. Cl.
CPC ........ *H04L 63/1425* (2013.01); *G06F 16/285* (2019.01)

(58) Field of Classification Search
CPC ............................ H04L 63/1425; G06F 16/285
USPC ........................................................... 726/23
See application file for complete search history.

(56) References Cited

U.S. PATENT DOCUMENTS

| | | | |
|---|---|---|---|
| 6,643,629 B2 | 11/2003 | Ramaswany et al. | |
| 2008/0247644 A1* | 10/2008 | Weber | G06F 17/18 |
| | | | 382/168 |
| 2018/0143945 A1 | 5/2018 | Mao et al. | |
| 2018/0189664 A1* | 7/2018 | Hegde | G06N 7/01 |
| 2019/0034836 A1* | 1/2019 | Chari | G06N 20/20 |
| 2019/0068627 A1 | 2/2019 | Thampy | |
| 2019/0087258 A1* | 3/2019 | Della Corte | G06F 11/3452 |

FOREIGN PATENT DOCUMENTS

| | | |
|---|---|---|
| CN | 102360378 A | 2/2012 |
| CN | 104462379 A | 3/2015 |
| CN | 105975510 A | 9/2016 |
| CN | 111539444 A | 8/2020 |

* cited by examiner

*Primary Examiner* — Jeffrey C Pwu
*Assistant Examiner* — Samuel Ambaye
(74) *Attorney, Agent, or Firm* — CPST Intellectual Property Inc.; Brett J. Slaney

(57) ABSTRACT

A system, non-transitory computer readable medium and method for detecting anomalous activity based on a data distribution is disclosed. The system includes a processor, and a memory coupled to the processor. The memory stores computer executable instructions that, when executed by the processor, cause the processor to obtain a plurality of datapoints defining a data distribution. The processor classifies the plurality of datapoints as isolated or non-isolated datapoints, and clusters at least some of the non-isolated datapoints into at least one mode segment. A reference mode from the at least one mode segment is identified, and at least one outlier being either an isolated or non-isolated datapoint separated from the reference mode by a predetermined number of isolated datapoints representing a flat portion is identified. An action is initiated based on the identified at least one outlier.

18 Claims, 17 Drawing Sheets

US 11,985,153 B2

SYSTEM AND METHOD FOR DETECTING ANOMALOUS ACTIVITY BASED ON A DATA DISTRIBUTION

TECHNICAL FIELD

The following relates generally to detecting anomalous activity in a computing environment, in particular based on a data distribution.

BACKGROUND

Increasing reliance upon computing resources for all facets of work and/or personal life has exposed an increasing amount of sensitive or personal data to risks associated with computing environments. Even environments typically not associated with computing have incorporated aspects of computing environments to generate data, such as using digital computing systems to measure physical phenomena. With this increasing digitalization, personal and/or work data is increasingly vulnerable to a variety of unauthorized or malicious uses, including skewing measurement data, data theft, or theft facilitated by access to computing systems.

As a result of increasing digitalization, various systems to increase security of computing environments have evolved. Some existing security implementations, such as those which rely on mathematical formulas and data distribution measurements, may seek to identify outliers by offering a threshold value above which any value would be considered an outlier. However, these existing methods may not automate outlier detection, be imprecise, or lack accuracy.

Improvements to detecting outliers to enhance security, or otherwise detect anomalies within data distributions associated with computing systems are desirable.

BRIEF DESCRIPTION OF THE DRAWINGS

Embodiments will now be described with reference to the appended drawings wherein.

DETAILED DESCRIPTION

Figure 1A:
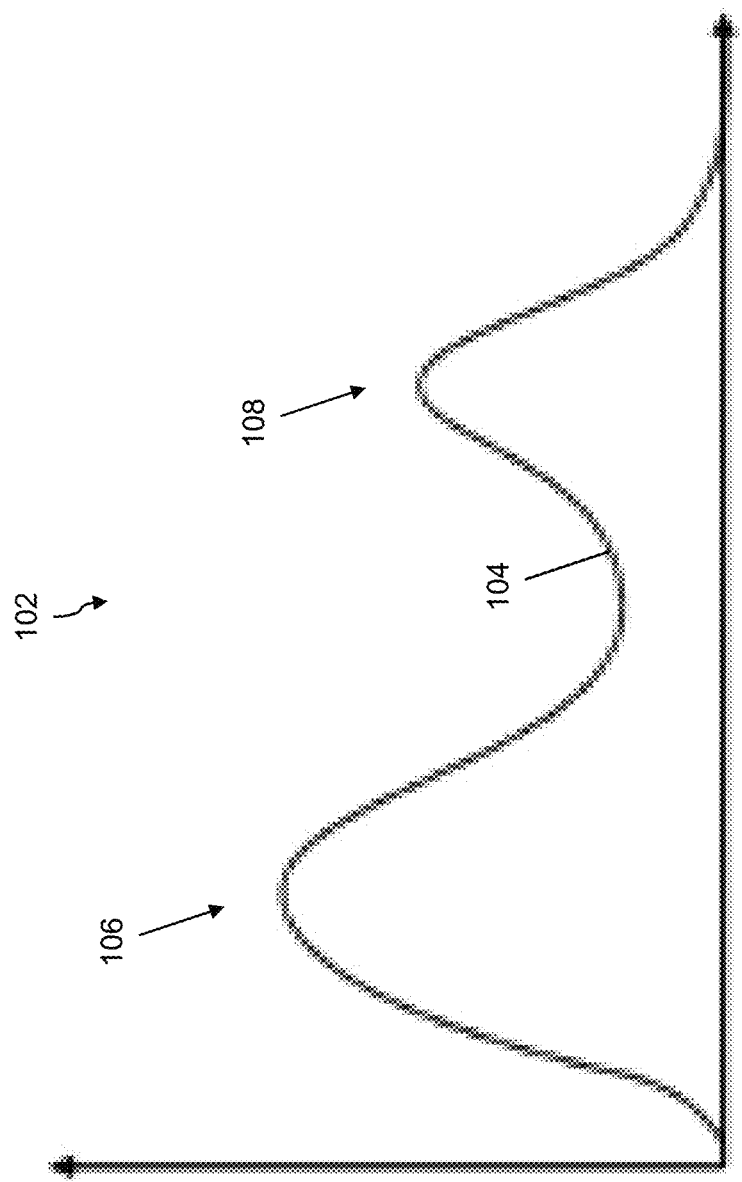
FIGS. 1A to 1C are each a graph of a data distribution.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

Hereinafter, the term data distribution shall be used to describe a function or a listing which shows collected values or intervals of a plurality of datapoints (i.e., observations). It is understood that the term data distribution may refer to nominal, ordinal, interval, or ratio data. Data distributions can take many forms, including single mode data distributions and distributions which are multi-modal.

Existing systems may employ rigid mathematical definitions to identify outliers; however determining whether a datapoint is an outlier can be a subjective exercise. Various methods of outlier detection are available, including graphical detection schemes such as normal probability plots, model-based schemes, or hybrid schemes such as box plots. Model-based schemes which are commonly used for identification assume that the data are from a normal distribution and identify observations which are deemed "unlikely" based on mean and standard deviation.

Systems, devices, and methods for detecting anomalous activity based on identifying datapoints of a data distribution as outliers are described herein. The described systems may automate the detection of outliers by first at least classifying some datapoints as isolated or non-isolated, and thereafter clustering at least some of the non-isolated datapoints into a reference mode segment. The described embodiments may thus improve the functioning of a purposes specific computer to classify and cluster datapoints to: (1) distinguish unnatural modes from natural nodes, and (2) determine either natural or unnatural modes more quickly, allowing for more effective and timely monitoring. In a banking context, more rapidly identifying unnatural modes may allow for financial institutions to detect fraud more rapidly within the system, and to thereafter take preemptive steps with related computerized systems (e.g., a financial institution may establish new access parameters in response to detecting an anomaly in the number of withdrawals in a bank branch).

As a result of the classification and clustering described herein, the disclosed systems, devices, and methods may be more accurate in detecting outliers in data distributions, or more precise in identifying data distributions in at least some circumstances. More accurate or more precise detection can allow for many additional technical benefits, including effective deployment of computing resources to detect other anomalies where resources are limited, the ability for the disclosed systems to be used in environments where computing resources may be constrained, among other implementations.

To illustrate with an example, logs generated by a computing system, which contain data associated with different types of events, can include data entries indicative of rarely occurring events, errors, and outlier events. The logs, or the contents thereof, can be arranged or define a data distribution. For example, in a financial institution, the logs can store data identifying times and other data associated with accessing or otherwise changing customer or enterprise accounts. The collective behavior captured in the logs forming the data distribution may be monitored and can be indicative of outlier events. For example, outliers may include sudden, multiple occurrences within a relatively short time span of events expected to be rare (e.g., an employee viewing accounts of a customer of a distant branch). In another illustrative example, the logs analyzed in accordance with the disclosure may reveal a possible indicator that the frequency of occurrence of certain common types of events is an outlier indicative of a malicious activity or a massive system failure (e.g., many personal accounts to different individuals having the same authorized user).

The disclosed systems, devices and methods may distinguish between natural and unnatural modes by at least in part determining whether the one or more datapoints (isolated or otherwise), or whether one or more segments (isolated or otherwise), are sufficiently far away from a determined mode segment.

Figure 1B:
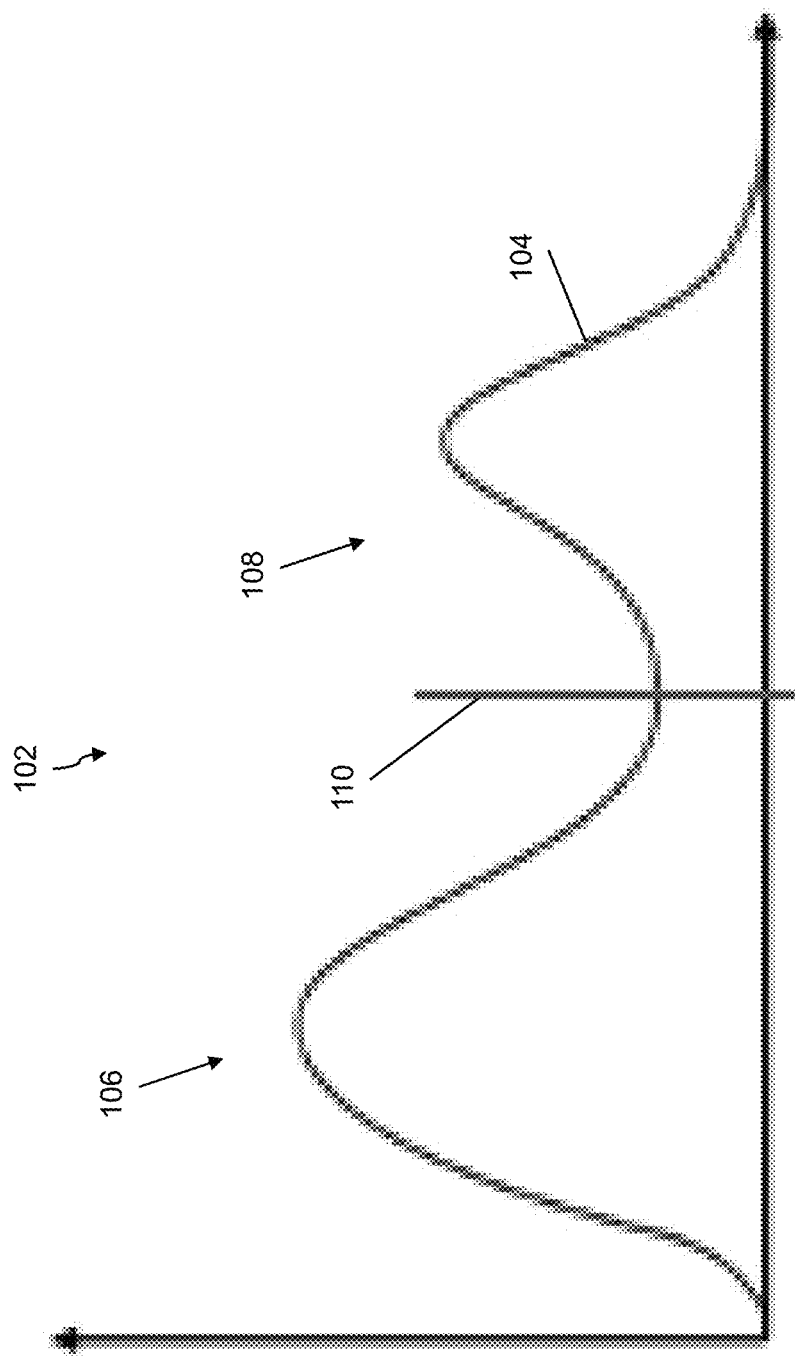
Figure 1C:
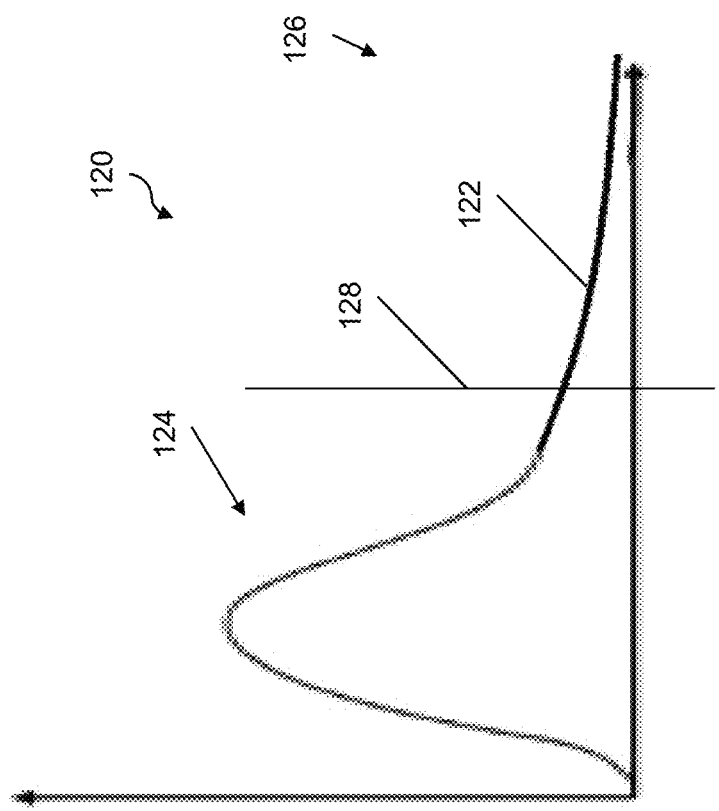

In a multi-modal distribution, the disclosed method can determine whether the tail portion(s) of the modes are outliers or determine whether at least one of the modes itself is an outlier. In the illustrative example in FIG. 1A, a graph 102 of a data distribution 104 defining two possible modes 106 and 108 is shown. A method of detecting outliers has as objectives of: (1) identifying whether possible modes 106 and 108 should be classified as modes, and (2) determining whether either of the modes 106 and 108 or other portions of graph 102 are outliers. The disclosed method may first determine the bounds of each of the modes 106 and 108, shown by illustrative divider 110 (FIG. 1B). The method may determine whether one or more of the modes is an outlier, so that in the example shown in graph 102 the divider 110 is an example of a visual representation of the separation of the multimodal data distribution 104 into outliers (e.g., mode 108) and other than outlier (e.g., mode 106). A similar illustrative example with respect to a data distribution 122 having a single mode is shown in graph 120 of FIG. 1C. The outlier detection method can delineate between or define a mode 124 and the beginning of a tail portion 126, where the determination is shown by illustrative divider 128 to emphasize the separation of the data distribution 122 into outliers (e.g., tail portion 126) and other than outliers (e.g., mode 124).

In one aspect, a system for detecting anomalous activity based on a data distribution is disclosed. The system includes a processor, a communications module coupled to the processor, and a memory coupled to the processor. The memory stores computer executable instructions that when executed by the processor cause the processor to obtain a plurality of datapoints via the communication module. The datapoints define the data distribution, each of the datapoints being representative of either: i) a frequency of one or more monitored phenomena, or ii) a time associated with particular frequencies of the monitored phenomena occurring. The processor classifies the plurality of datapoints as isolated or non-isolated datapoints, and clusters at least some of the non-isolated datapoints into at least one mode segment. The processor identifies a reference mode from the at least one mode segment, and identifies as at least one outlier, each outlier being either an isolated or non-isolated datapoint separated from the reference mode by a predetermined number of isolated datapoints representing a flat portion. The processor initiates an action based on the identified at least one outlier.

In example embodiments, the action comprises sending a notification to a data analyst via the communication module.

In example embodiments, the action comprises providing an output to a monitoring system via the communications module. The action can include initiating a fraud or security breach protocol for an account associated with the outliers.

In example embodiments, the processor clusters all the datapoints into one or more segments, the one or more segments including the at least one mode segment and/or isolated segments. Determining if one or more of the isolated or non-isolated points is separated from the reference mode segment by the predetermined number of isolated datapoints representing the flat portion includes determining whether the isolated segments include the predetermined number of isolated datapoints representing the flat portion.

In example embodiments, the segments are clustered using one of k-means, Jenks Natural Breaks Optimization, or Kernel Density Estimation.

In example embodiments, the at least some of the non-isolated datapoints are clustered into at least two mode segments, and the processor determines if a further mode segment of the at least two mode segments is separated from the reference mode by the predetermined number of isolated datapoints.

In example embodiments, the data distribution is a histogram, each of the datapoints comprises a bar of the histogram, and the frequency or the particular frequencies of the monitored phenomena denote frequencies of accessing a bank account or an employee terminal.

In example embodiments, datapoints are classified into isolated or non-isolated datapoints based on their proximity to one another. The datapoints can be classified using a local outlier factor (LOF) technique.

In another aspect, a method for detecting anomalous activity based on a data distribution is disclosed. The method includes obtaining a plurality of datapoints, the datapoints defining the data distribution. Each of the datapoints are representative of either: i) a frequency of one or more monitored phenomena, or ii) a time associated with particular frequencies of the monitored phenomena occurring. The method includes classifying the plurality of datapoints as isolated or non-isolated datapoints, and clustering at least some of the non-isolated datapoints into at least one mode segment. The method includes identifying a reference mode from the at least one mode segment and identifying as at least one outlier. Each outlier is either an isolated or non-isolated datapoint separated from the reference mode by a predetermined number of isolated datapoints representing a flat portion. The method includes initiating an action based on the identified at least one outlier.

In example embodiments, the action comprises sending a notification to a data analyst.

In example embodiments, the action comprises providing an output to a monitoring system. The action can include initiating a fraud or security breach protocol for an account associated with the outliers.

In example embodiments, the method includes clustering all the datapoints into one or more segments, the one or more segments including the at least one mode segment and/or isolated segments. Determining if one or more of the isolated or non-isolated points is separated from the reference mode segment by the predetermined number of isolated datapoints representing the flat portion can include determining whether the isolated segments include the predetermined number of isolated datapoints representing the flat portion.

In example embodiments, the segments are clustered using one of k-means, Jenks Natural Breaks Optimization, or Kernel Density Estimation.

In example embodiments, the at least some of the non-isolated datapoints are clustered into at least two mode segments, and the method further includes determining if a further mode segment of the at least two mode segments is separated from the reference mode by the predetermined number of isolated datapoints.

In example embodiments, the data distribution is a histogram, each of the datapoints comprises a bar of the histogram, and the frequency or the particular frequencies of the monitored phenomena denote frequencies of accessing a bank account or an employee terminal.

In example embodiments, datapoints are classified into isolated or non-isolated datapoints based on their proximity to one another.

In a further aspect, a non-transitory computer readable medium for detecting anomalous activity based on a data distribution is disclosed. The computer readable medium includes computer executable instructions for obtaining a plurality of datapoints, the datapoints defining the data distribution. Each of the datapoints is representative of either: i) a frequency of one or more monitored phenomena, or ii) a time associated with particular frequencies of the monitored phenomena occurring. The computer executable instructions are for classifying the plurality of datapoints as isolated or non-isolated datapoints, and clustering at least some of the non-isolated datapoints into at least one mode segment. The computer executable instructions are for identifying a reference mode from the at least one mode segment, and identifying as at least one outlier, each outlier being either an isolated or non-isolated datapoint separated from the reference mode by a predetermined number of isolated datapoints representing a flat portion. The computer executable instructions are for initiating an action based on the identified at least one outlier.

Figure 2:
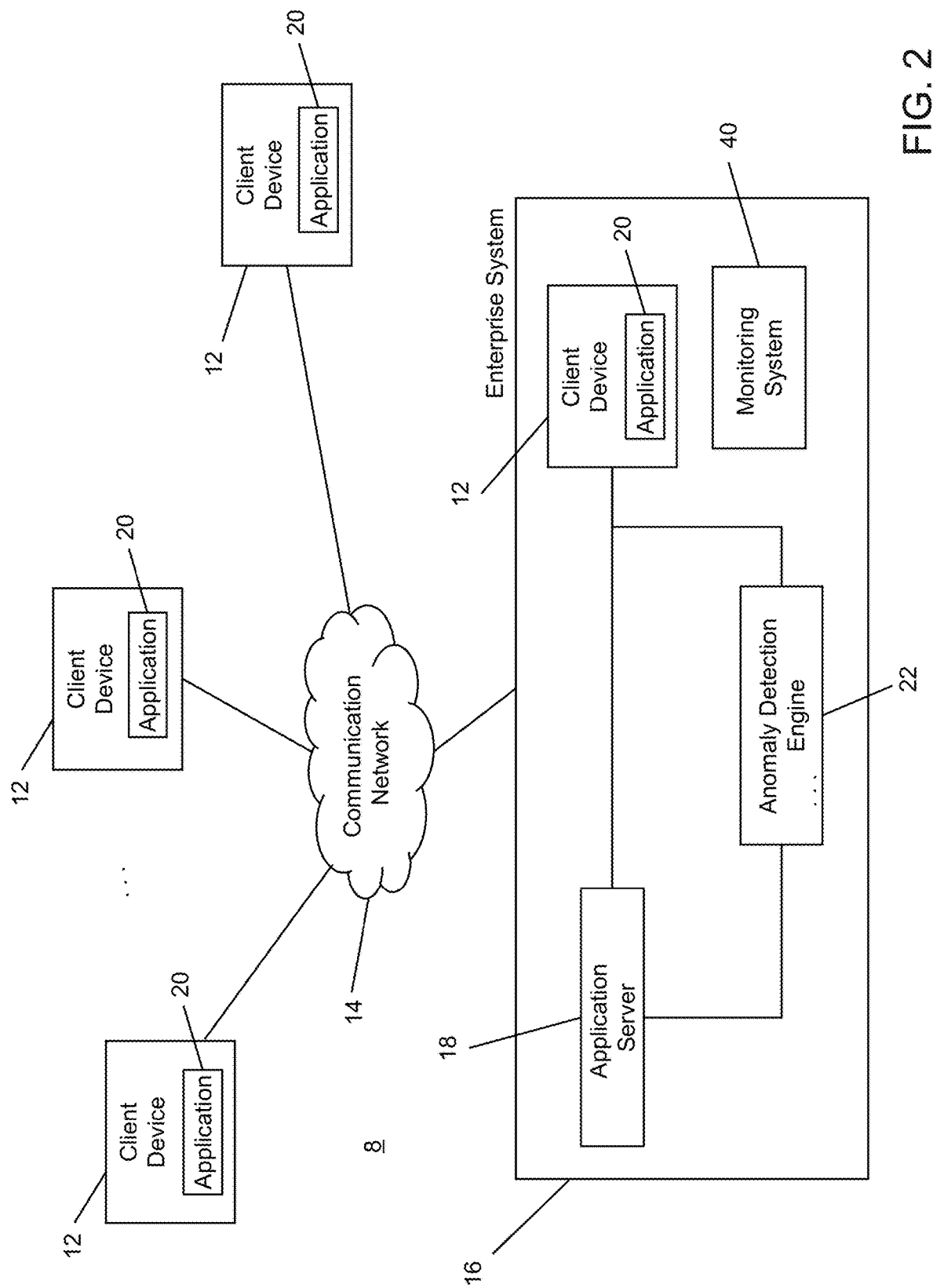
FIG. 2 is a schematic diagram of a system for detecting anomalous activity based on a data distribution.

Referring now to FIG. 2, an exemplary computing environment 8 is illustrated. In one aspect, the computing environment 8 may include an enterprise system 16 hosting an anomaly detection engine 22, one or more client devices 12, and a communications network 14 connecting one or more components of the computing environment 8.

The enterprise system 16 may be associated with a financial institution system (e.g., a commercial bank) that provides financial services to users or enterprises and provides access to employees to perform banking related functions from a client device 12. This can include providing customer service options via an application 20 that can be downloaded to and used by users of the client devices 12. In another aspect, the application 20 is used by employees or other stakeholders of the financial institution system to access resources to which access is controlled by enterprise system 16. The enterprise system 16 includes an application server 18 used to host, serve, or monitor the application 20, whether the application 20 is instantiated on the enterprise system 16 or any one of the client devices 12.

The application 20 or a subfunction of the application 20, or different instances of the application 20 can be associated with a department, line of business, service or other entity or sub-entity within or associated with the enterprise system 16. For example, in a financial institution system, one instance of the application 20 can be associated with everyday banking while another instance of application 20 can be associated with credit accounts or investment accounts, mortgages, insurance, etc. The client devices 12 can be associated with various functional units of a customer, employee, or stakeholder. While several details of the enterprise system 16 have been omitted for clarity of illustration, reference will be made to FIG. 12 below for additional details.

The anomaly detection engine 22 receives or retrieves datapoints from the application 20 to detect anomalies. The application 20 or a subfunction of the application 20, or different instances of the application 20 can be used to define different data distributions with the received or retrieved datapoints. Datapoints may be a log including a plurality of data, such as an age of a customer account, a type of service, various times associated with logins, data associated with actions performed on the account, and metadata associated with the log such as when the log was created, etc. The datapoints can be used to form a variety of different data distributions (e.g., a first distribution may be the age of an account administrator associated with each account opened in a particular month, a second distribution may be defined to include all withdrawal activity above a certain amount within a certain branch, etc.)

Returning now to the client devices 12, they can be separate devices as shown in FIG. 2 or a component of the enterprise system 16. Similarly, the application 20 (or instances or subcomponents thereof) can be separately hosted on each client device 12 as shown in FIG. 2, or hosted by the enterprise system 16.

Client devices 12 may be associated with one or more users. Users may be referred to herein as customers, clients, correspondents, agents, employees, or other entities that interact with the enterprise system 16 and/or anomaly detection engine 22 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with a mobile or web-based banking application (i.e., the application 20) which permits the anomaly detection engine 22 to determine anomalies in either the performance of the application 20 or of a particular the client device 12, or of a particular use of the client device 12 by the user. In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

As discussed herein, the client devices 12 can have varying access to enterprise resources of the enterprise system 16 to perform a variety of functions, including employment related tasks (e.g., updating records), stakeholder related tasks (e.g., a contractor servicing a database) and customer related tasks (e.g., withdrawals).

Communication network 14 may include a telephone network, cellular, and/or data communication network to connect different types of client devices 12, or the enterprise system 16 to other devices or one another. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

In one embodiment, anomaly detection engine 22 may be one or more computer routines executed by the application server 18 to process and store information and execute software instructions to perform one or more processes consistent with the disclosed embodiments. In certain embodiments, although not required, anomaly detection engine 22 may be associated with one or more business entities. In certain embodiments, the anomaly detection engine 22 may represent or be part of any type of business entity. For example, anomaly detection engine 22 may be a routine associated with a commercial bank (e.g., enterprise system 16), a retailer, utility, government entity, educational institution, or some other type of business. The anomaly detection engine 22 can also operate as a standalone entity (see, e.g., FIG. 3) that is configured to serve multiple business entities, e.g., to act as an agent therefor.

Continuing with FIG. 2, the anomaly detection engine 22 and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public, and private keys in a PKI), and perform other cryptographic operations that are required or desired for particular applications of the anomaly detection engine 22 and enterprise system 16. The cryptographic server may be used to protect sensitive data (e.g., financial data) and/or data stored on enterprise database 36 and/or cluster database 30 and/or classification database 32 and/or model database 34 (see, e.g., FIG. 3), by way of encryption for data protection, digital signatures or message digests for data integrity, and by using digital certificates to authenticate the identity of the users and client devices 12 with which the enterprise system 16 and/or anomaly detection engine 22 communicates to inhibit data breaches by adversaries. It can be appreciated that various cryptographic mechanisms and protocols can be chosen and implemented to suit the constraints and requirements of the deployment of the anomaly detection engine 22 or enterprise system 16 as is known in the art.

Figure 3:
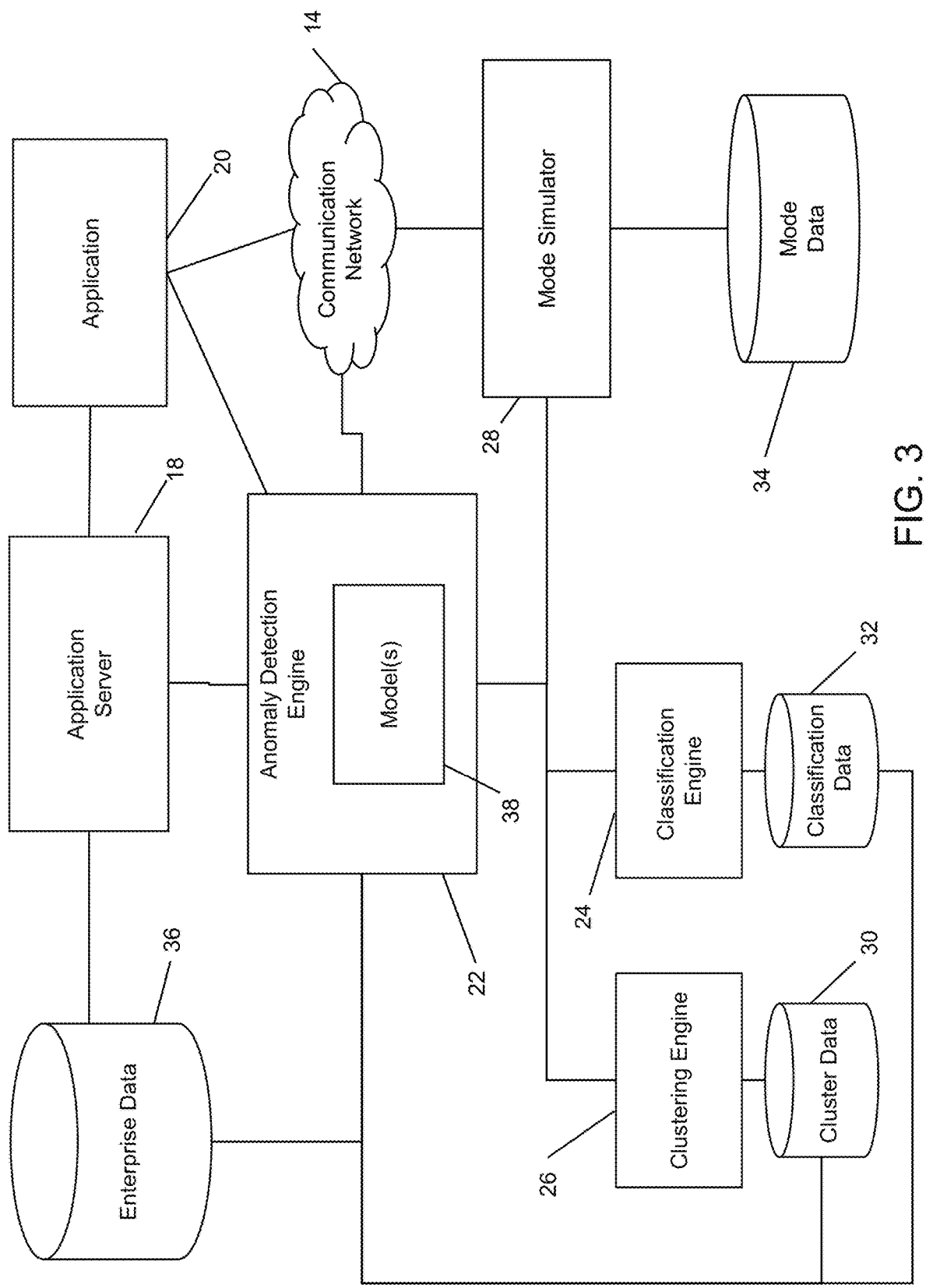
FIG. 3 is schematic diagram of a computing environment for detecting anomalous activity based on a data distribution

Referring now to FIG. 3, the anomaly detection engine 22 is shown as coupled to various components, entities, and services of, or associated with, the enterprise system 16 and application 20. The anomaly detection engine 22 is also coupled to or associated with a classification engine 24 and a clustering engine 26 which can be used to respectively, classify points of a data distribution, and cluster classified points into mode segments and determine reference modes based on mode segments.

In example embodiments, the anomaly detection engine 22 communicates with the application server 18 to monitor and detect anomalies facilitated by or related to the use of the application 20 or in the operation of application server 18. The anomaly detection engine 22 can leverage details of accounts, client data, product data, service data, or feature data of the enterprise system 16 stored in an enterprise database 36, or collected over time by application 20, to establish reference modes. In an illustrative example, the mode simulator 28 of the anomaly detection engine 22 can retrieve data from the enterprise database 36 to establish that an expected data distribution associated with a frequency or amount of customer cash withdrawals is a normal distribution (i.e., the frequency of withdrawals of a particular amount can be the y-axis, or the frequency of withdrawals within a particular monetary range can be the y-axis, etc.). In another illustrative example, the mode simulator 28 of the anomaly detection engine 22 can retrieve data from the enterprise database 36 to establish that an expected data distribution associated with a frequency of account openings or changes to an account associated with a particular individual, or a frequency of account activity associated with an average individual is a student's t distribution. Furthermore, the expected data distribution can be multi-modal, or multi-dimensional, or both.

As set out herein, the anomaly detection engine 22 can detect anomalies continuously, periodically or on an ad hoc basis. The anomaly detection engine 22 in at least some embodiments detects anomalies in real time or can be configured to review datapoints after user actions facilitated by or related to the use of the application 20 have been completed. The anomaly detection engine 22 can receive data from the application server 18 or client devices 12 directly (e.g., the anomaly detection engine 22 can be located between application 20 in FIG. 3, running on a client device 12, and the application server 18) to monitor and detect anomalies facilitated by or related to the use of the application 20.

The application server 18 includes or otherwise has access to an enterprise database 36, which can include data stored by a client device 12 and/or provide a cache for same. The data within the enterprise database 36 may include any information or content, such as account data, personal or employee data, conversation scripts or other contextual data (e.g., from call center interactions), metadata, tags, notes, files (e.g., PDFs, reports, word documents), links (e.g., uniform resource locators (URLs)), images, videos, etc. that are created from or otherwise relate to interactions (e.g., conversations) between entities in the computing environment 8, in particular those made using client devices 12 via one or more communication channels available via the communication network 14 or by client devices 12 within the enterprise system 16. As such, the enterprise database 36 can be used by the anomaly detection engine 22 in performing operations such as those described herein. The client or employee data stored on enterprise database 36 may include both data associated with a user of a client device 12 that interacts with the enterprise system 16 or application 20 (e.g., for participating in mobile banking and using customer service channels associated with such banking, or for performing employment related tasks), transaction history data that is captured and provided with a transaction entry (e.g., data captured by a graphical user interface of a document management system, or a mobile or web-based banking application.), or enterprise data (e.g., internal policies, etc.). In at least one embodiment, data stored within enterprise database 36 can be mapped or otherwise associated with other data or profiles (e.g., an employee profile) within enterprise database 36. For example, client profile data that may be mapped to corresponding financial data for that user and/or may include some of the financial data. The data associated with a client or employee may include, without limitation, demographic data (e.g., age, gender, income, location, etc.), preference data input by the client, financial data, and inferred data generated through machine learning, modeling, pattern matching, or other automated techniques.

The client or employee profile data may also include historical interactions and transactions associated with the enterprise system 16, e.g., login history, search history, communication logs, metadata, files, documents, etc.

It can be appreciated that the enterprise database 36 can include one or more servers or storage devices which can be separate components of a larger database system. The database system can include any data associated with the application server 18 or enterprise system 16, and for illustrative purposes may also be at least partially stored within a database, memory, or portion thereof within the enterprise system 16.

While the terms enterprise system 16 and enterprise database 36 are used in this disclosure, it is understood that these terms disclose elements which can be used other than in association with an enterprise. For example, the enterprise system 16 can be a personal system, which includes a dedicated home database and computing system for use in, for example, a security system.

The anomaly detection engine 22 includes or has access to one or more machine learning systems, which can be employed to train one or more models 38 by employing various machine learning techniques that can be used over time to continuously train and retrain models 38. In example embodiments, the models 38 incorporate or rely upon one or more of i) a classification engine 24 for identifying which set of categories (sub-populations) a datapoint of the data distribution belongs to, ii) a clustering engine 26 for dividing the datapoints into groups such that datapoints in the same groups are more similar to other datapoints within the same group as compared to datapoints other groups, and iii) the aforementioned mode simulator 28. The classification engine 24, the clustering engine 26, and the mode simulator 28 can include a respective classification database 32, cluster database 30, and mode database 34 which may store learned groupings or classifications of datapoints for providing to the anomaly detection engine 22. In the case of mode database 34, the expected reference mode for the particular data distribution may be stored, or data which can be used to determine or approximate a reference mode for the particular data distribution may be stored. The aforementioned databases can also store parameters defining the respective classification engine 24, the clustering engine 26, or mode simulator 28. For example, the classification database 32 may store parameters, which when implemented by a processor enact a local outlier factor (LOF) routine. The LOF routine helps classify datapoints by measuring the local deviation of a given datapoint with respect to its neighbors (i.e., datapoints are classified into isolated or non-isolated datapoints at least in part based on their proximity to one another). The cluster database 30 may include parameters which when implemented by a processor enact a heuristic or model-based clustering of datapoints, for example with parameters defining any one of a k-means, Jenks Natural Breaks Optimization, or Kernel Density method.

The machine learning systems can update the model(s) 38 based on new datapoints stored in any one of enterprise database 36, cluster database 30, classification database 32, and mode database 34, as discussed in greater detail below.

Figure 4:
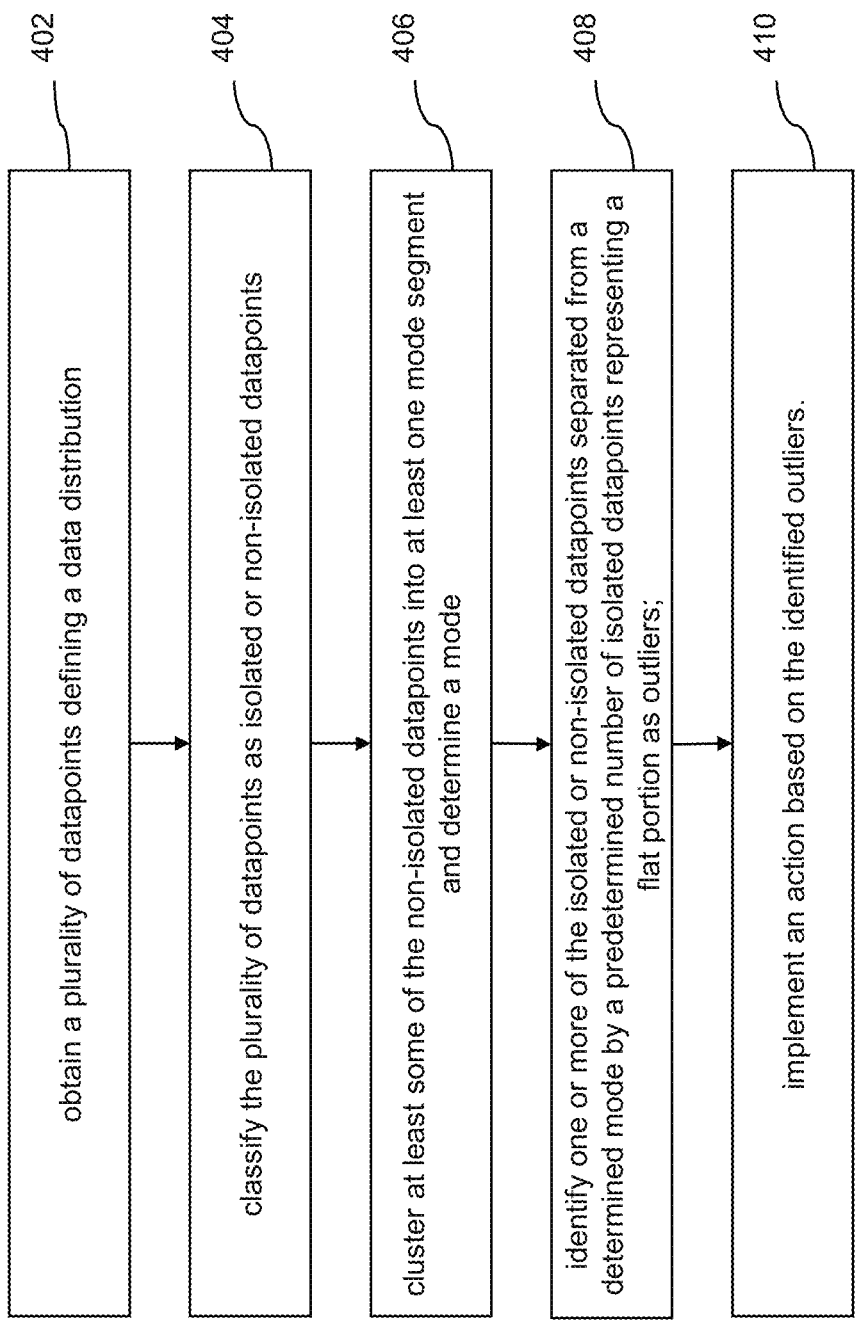
FIG. 4 is a flow diagram illustrating example computer executable instructions for detecting anomalous activity.

Reference is now made to FIG. 4, which is a flow diagram of an example set of computer executable instructions for detecting anomalous activity. To provide illustrative context to the instructions described in FIG. 4, the blocks in FIG. 4 will be described with reference to the data distributions of FIGS. 4A, 4B, 4C, 4D, 4E, 5A, 5B, 5C, 6, 7A, and 7B. It is understood that the blocks are not limited to the illustrative implementations described in the aforementioned figures.

At block 402, a server device or system associated with or used by the anomaly detection engine 22 obtains a plurality of datapoints which define a data distribution. As described herein, obtaining the datapoints can include retrieving the datapoints from the enterprise database 36, or from the application 20 itself, or otherwise and the datapoints represent one or more monitored phenomena associated with an input by a user using application 20. The datapoints can be logs which represent employee accesses to a customer account, or logs which represents customer withdrawal transactions. In example embodiments, a particular data distribution may be selected by the user of the server device. For example, the data distribution may be defined as being limited to a particular branch, or in relation to a different regional area, etc. The plurality of datapoints may form a distribution with a single mode (e.g., distribution 502 of FIG. 5A), or a multimodal distribution (e.g., distribution 510 of FIG. 5B).

At block 404, the anomaly detection engine 22 classifies the plurality of obtained datapoints as either isolated or non-isolated (i.e., sufficiently relatively interconnected) datapoints. In example embodiments, the anomaly detection engine 22 accesses or incorporates the classification engine 24 to implement machine learning methods to classify datapoints. For example, the classification database 32 may store parameters which facilitate the implementation of the LOF routine to classify datapoints. The LOF algorithm can measure the local deviation of a given datapoint with respect to its neighbors (i.e., a relative determination) and return as an output a value representative of whether the assessed datapoint has a similar density to its neighbors, a higher density to its neighbors (e.g., an indication that the assessed datapoint is an inlier), or a lower density to its neighbors (e.g., an indication that the assessed datapoint is an outlier). For example, the value may be less than one (e.g., lower density), one (e.g., a similar density), or greater than one (e.g., a higher density).

The obtained datapoints can be used for two different purposes: either the anomaly detection engine 22 can use the datapoints to train parameters of the machine learning methods stored in classification database 32, or the anomaly detection engine 22 may be pre-trained and process the obtained datapoints with the trained parameters to determine a classification.

Figure 5A:
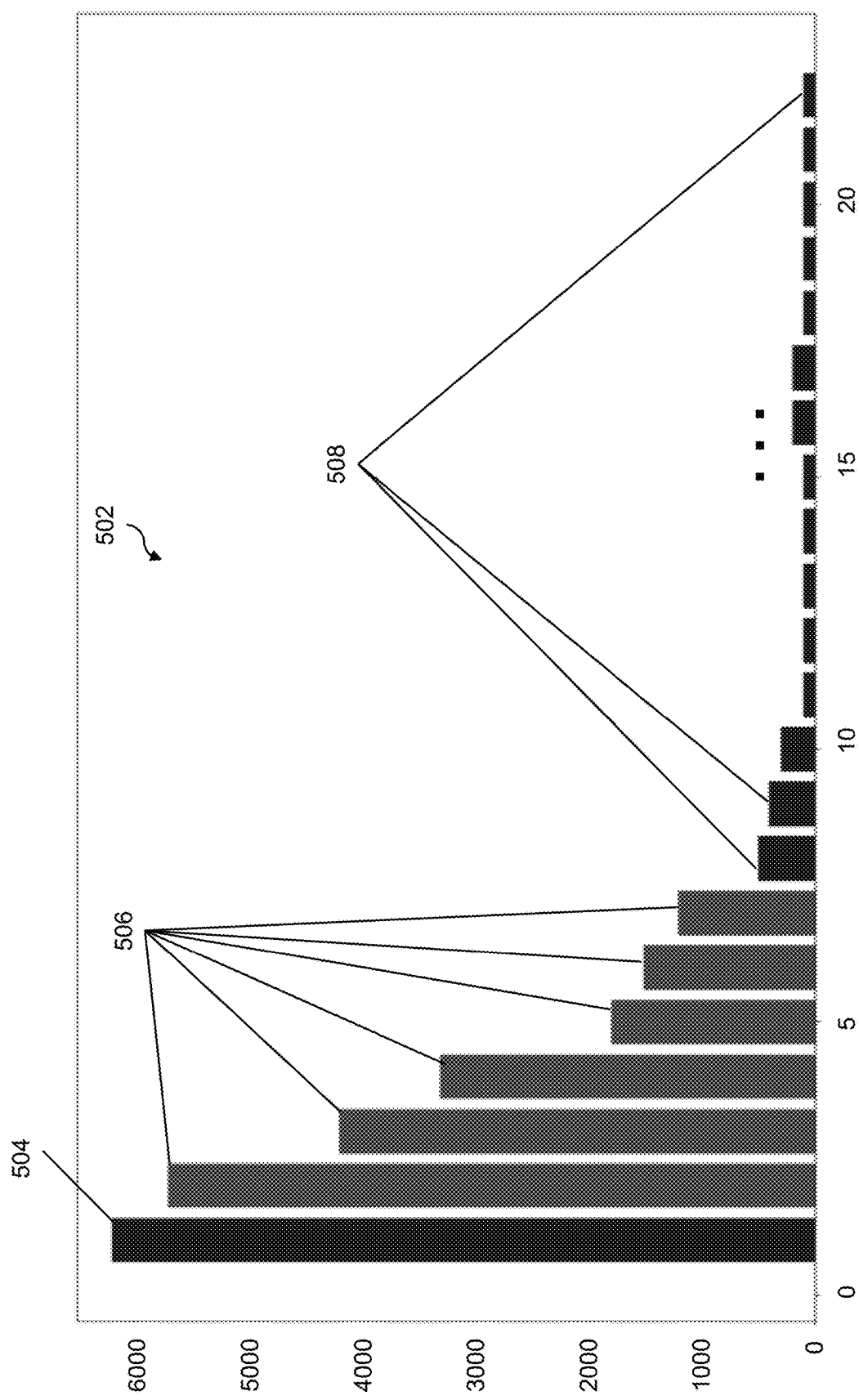
FIGS. 5A and 5B are each a graph of a data distribution with classified datapoints.
Figure 5B:
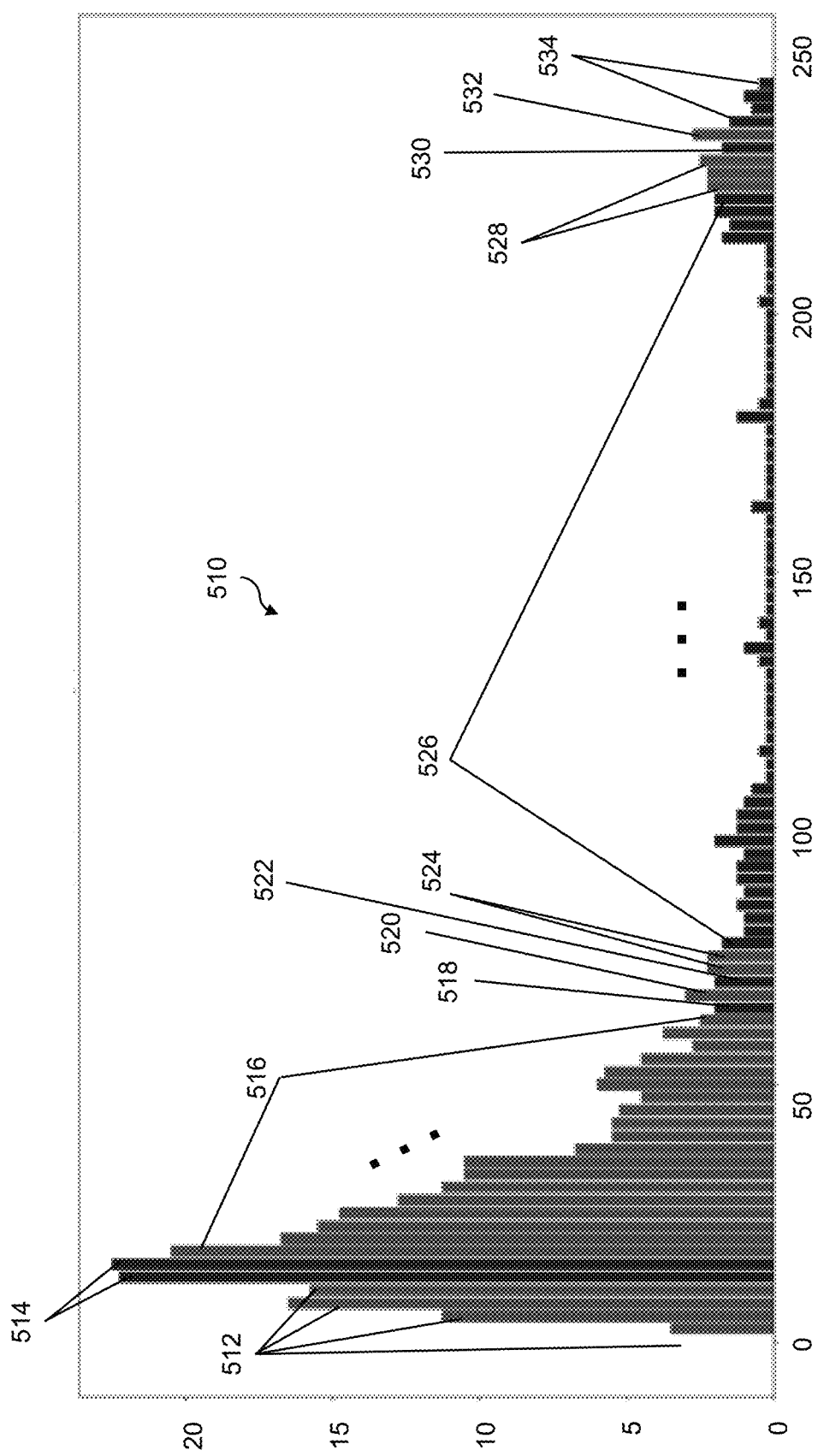

FIGS. 5A and 5B show a visual presentation of example data distributions processed with an LOF routine. FIG. 5A shows an example data distribution 502 of the frequency of a customer accessing their bank account (or, in another illustrative example, a frequency of an employee accessing the employee terminal) on particular day. The independent axis shows the distinct number of times a particular customer can access their bank account, and the dependent access shows the number of customers who accessed their accounts the particular number of times shown in the independent axis for a fictitious bank branch (i.e., FIG. 5A is a histogram). In FIG. 5A, datapoints 504, and 508 are classified by the anomaly detection engine 22 as isolated datapoints owing to their lack of similarity to their neighboring datapoints according to the LOF routine. For example, the anomaly detection engine 22 may identify the datapoints 504 and 508 as having values close to 1. Datapoints 506, in contrast to datapoints 504 and 508, are classified as non-isolated datapoints, as their lack of similarity to one another is indicative of their being part of a mode of the data distribution 502 (i.e., the data exhibits a "curve" with relatively unique values). Similarly, in the example shown in FIG. 5B, datapoints 512, 516, 520, 524, 528 and 532 are classified as non-isolated datapoints, and the remaining datapoints 514, 518, 522, 526, 530, and 534 are classified as isolated datapoints. It will be appreciated that in FIG. 5B not all datapoints have been provided an individual reference number, and that the reference number may include more than one datapoint (e.g., datapoint 526 includes a plurality of datapoints). The independent axis in FIG. 5B shows the number of accounts opened within a branch during the course of a week. The dependent axis indicates the number of distinct branches which have opened the number of accounts indicated on the independent axis.

At block 406, the server device associated with or used by the anomaly detection engine 22 clusters at least some of the non-isolated datapoints into at least one mode segment (the reference segment), or clusters some datapoints into at least one mode segment and isolated segment(s), or clusters all the datapoints into either mode segments or isolated segments. Anomaly detection engine 22 can access or incorporate the clustering engine 26 which includes various machine learning methods for clustering datapoints into segments. For example, the clustering engine 26 may include a plurality of parameters that define the Jenks Natural Breaks Optimization method to seek to reduce the variance within classes and maximize the variance between classes. For example, the clustering engine 26 may propose and evaluate different candidate clusters and assess the inter-group and intra-group variance, and output or select the candidate clusters with the highest inter-group variance and lowest intra-group variance. The clustering engine 26 can be configured to evaluate candidate mode segments based on expectations that frequency values which span a range of close-to-unique values (e.g., the peak value commonly occurring only once, other values on each side commonly occurring possibly twice) are modes, whereas candidate segments which are largely flat, and span a very narrow range of frequently reoccurring frequency values (e.g., close to zero) are flat portions.

In example embodiments, segments may be identified as isolated or non-isolated based on their composition of datapoints. For example, a segment which includes more than 50% non-isolated datapoints can be identified as a mode segment. Similarly, a segment which includes more than 50% isolated datapoints can be identified as an isolated segment. In example embodiments, the composition criteria are asymmetrical, with classification of a segment as a mode segment being less difficult to satisfy relative to isolated segments to promote the finding of at least one mode segment.

Figure 6:
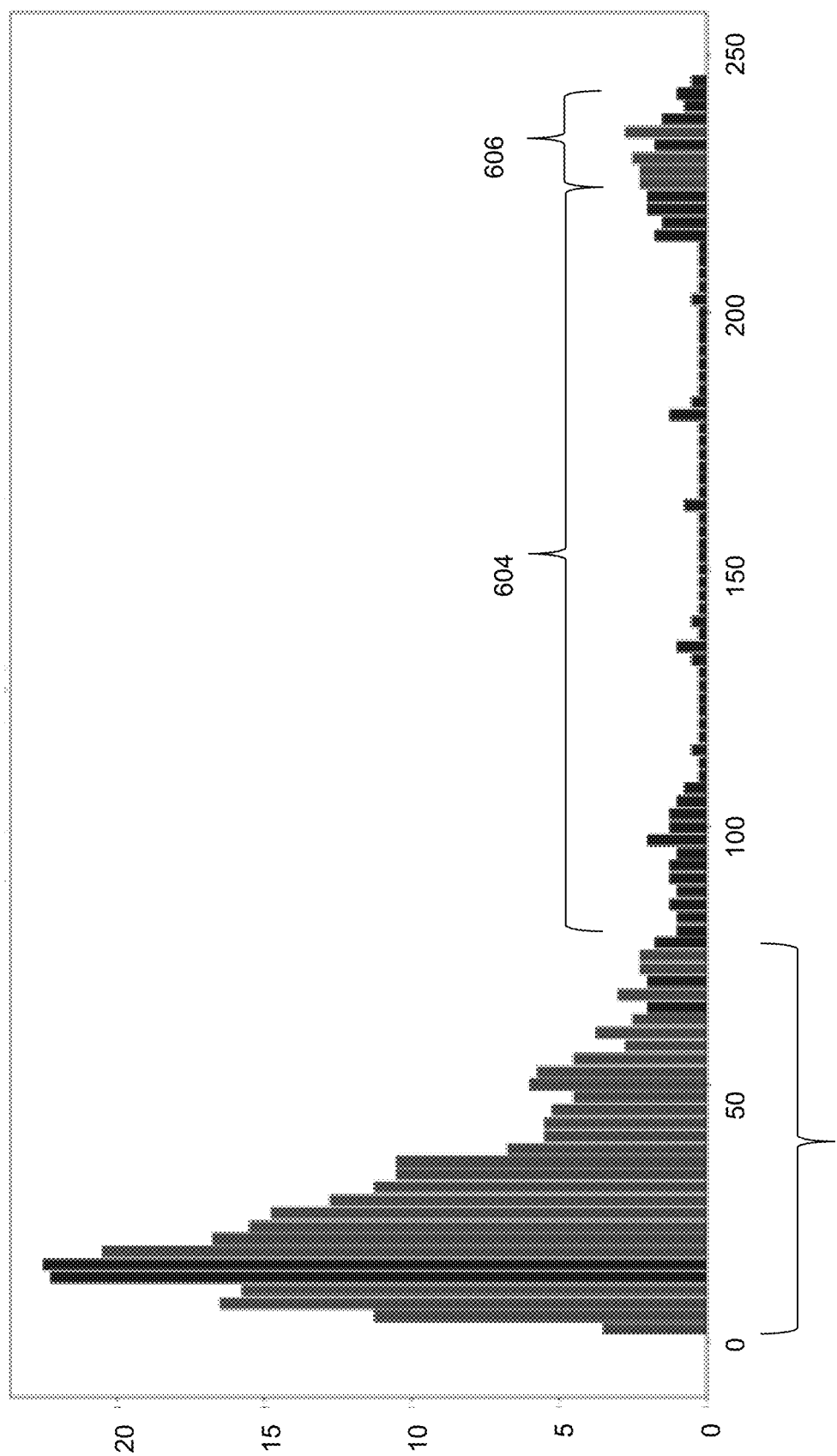
FIGS. 6, 7A, and 7B, are each a graph of a data distribution with clustered datapoints.

Referring to FIG. 6, the data distribution of FIG. 5A is shown clustered into mode segment 602, isolated segment 604, and mode segment 606. As is shown in FIG. 6A, mode segment 606 was identified by the clustering engine 26 as including the isolated datapoints 530 and 534.

Where more than one mode segment is identified as a result of clustering, the anomaly detection engine 22 determines a reference mode segment from the identified mode segments. Various methods can be used to determine the reference mode segment. In example embodiments, the reference mode segment is the mode segment which more closely matches mode properties of the expected mode segment stored or otherwise identified by mode simulator 28 (e.g., the mode segment which exhibits the most similarity with the Student's t distribution is determined to be the reference mode segment). In at least one embodiment, the largest mode segment is selected as the reference mode segment (e.g., where the data is related to account openings, and it is expected that many account openings will occur other than in outlier frequencies). The reference mode segment may be determined based on the span of the mode segment, may be separately identified from the modes via user input, etc.

At block 408, the server device associated with or used by the anomaly detection engine 22 determines whether one or more of the isolated or non-isolated datapoints (or one or more of the isolated or non-isolated segments) is separated from the reference mode by a predetermined number of isolated datapoints representing a flat portion.

In example embodiments, the block 408 and the block 406 can be completed simultaneously, or the completion of block 406 involves the completion the block 408. For example, the clustering engine 26 may consider or factor the classification of the datapoints as a value to account for on a second dimension when assessing candidate clusters and identify each cluster segment of the selected candidate cluster segments based at least in part on this second dimension. This method may be implemented by all or a subset of the plurality of parameters defining the machine learning algorithm stored within the clustering database 30. For further clarification, a pre-configured or trained clustering engine 26 can be a machine learning algorithm with a plurality of parameters, where either (1) obtained datapoints are provided to different subcomponents (i.e., matrices) of the clustering engine 26, which subcomponents have specific parameters that define a "default" where all datapoints are particularized as either belonging to a mode segment or an isolated segment, with the combination of specific parameters and providing the data to the specific subcomponent implementing the "default" configuration, or (2) the clustering engine 26 is taught the default by updating the parameters via training to "learn" parameters that output or generate outputs based on processing according to the "default". In an illustrative example of "learning" parameters, the clustering engine 26 can learn what constitutes a predetermined number of isolated datapoints based on iteratively processing training datasets with at least some "long enough" segments, with the training examples including correct or expected outputs (sometimes referred to as labels) in response to the provided training example. The clustering engine 26 can associate a penalty based on a comparison of a processed output and the expected output, and via the penalty learns to identify outlier modes in part based on features extracted from the training data. Therefore, in example embodiments, clustering the datapoints into isolated segments inherently also clusters the datapoints into non-isolated segments. Alternatively, in a similar manner, the clustering engine 26 can learn parameters which learn to cluster the at least some of the non-isolated datapoints into mode segments based on training data labelled with mode segments, which can also inherently identify isolated segments.

In at least one embodiment, the anomaly detection engine 22 is configured with particular values of what constitutes the predetermined number of isolated datapoints representing the flat portion. For example, referring now to the single mode distribution 502 in FIG. 7A, the anomaly detection engine 22 may identify as flat portions datapoints in a segment which spans at least 70% of the data distribution 502 and contains up to 20% of the non-isolated points of the data distribution 502. Based on this configuration, the anomaly detection engine 22 can identify datapoints within segment 706 as being part of a flat portion, with datapoints within segment 706 spanning the area of 7-22 and therefore $16/22$ (~73%) of the distribution 502 and containing $1/6$ (~17%) of the non-isolated points identified in FIG. 5A.

Consequently, and as further discussed herein, the anomaly detection engine 22 may identify segment 704 as a mode segment. The anomaly detection engine 22 can also be configured to identify all flat portions as any unnaturally long non-modal parts (i.e., outliers) of the distribution 502, where isolated segments which are not flat portions can be identified as natural occurrences.

Figure 7A:
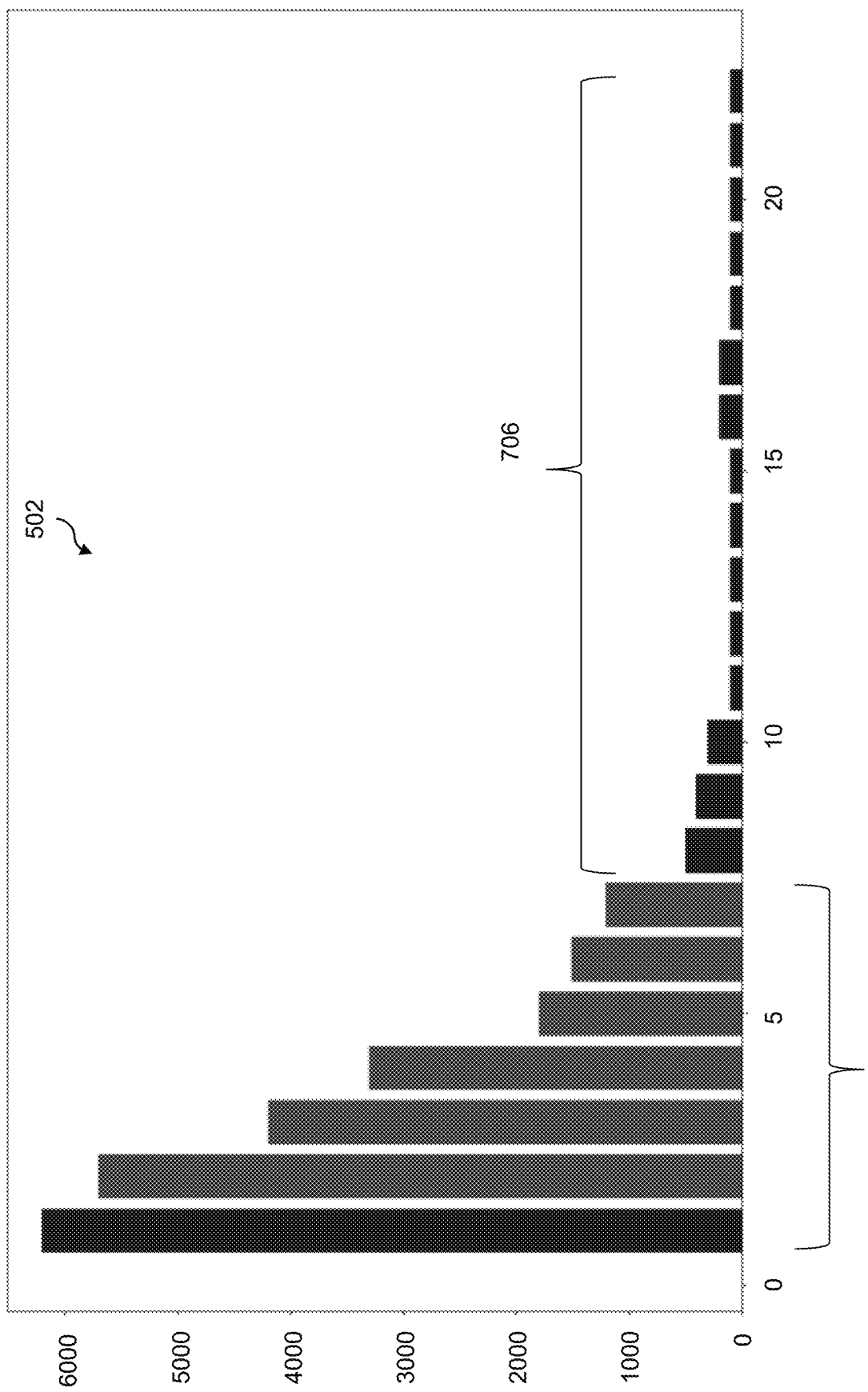
Figure 7B:
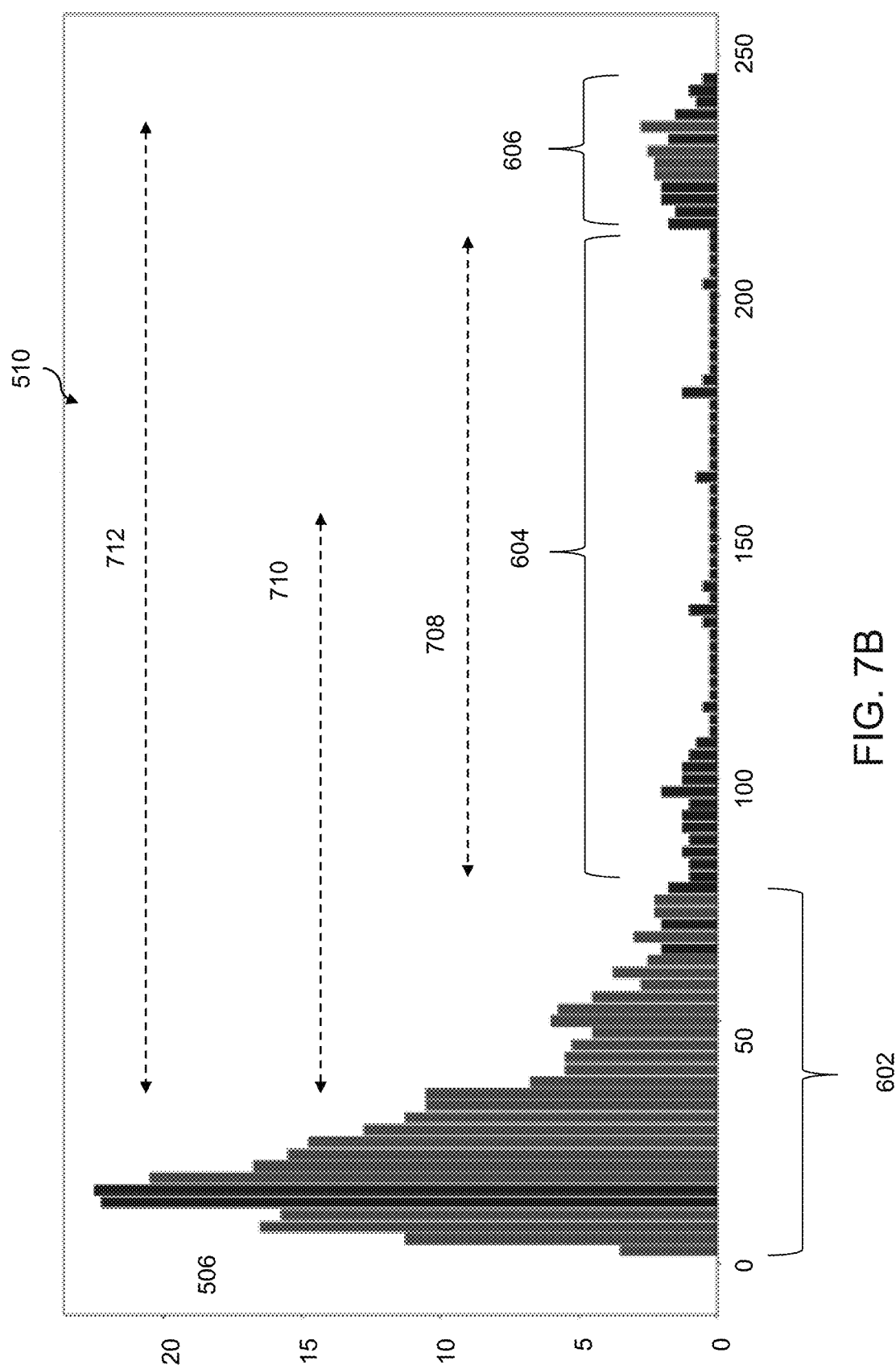

In example embodiments, the anomaly detection engine 22 identifies all points separated from the mode segment 704 by the flat portion 706 as outliers. In FIGS. 6 and 7B, the distribution 510 of FIG. 5B is shown clustered into segments 602, 604 and 606 by anomaly detection engine 22 (e.g., based on block 406). Similar to FIG. 7A, the anomaly detection engine 22 can determine whether the isolated segments (which can be determined based on their composition, where isolated segments have at least 70% non-isolated points) are flat portions based on the composition of the isolated segment relative to the data distribution 510. For example, where the isolated segment contains a majority of non-isolated points of the data distribution 510, the isolated segment can be identified as a flat portion. In FIG. 7B, isolated segment 604 does satisfy the example flat segment criteria, and therefore the mode segment 606 is separated from the mode segment 602 by the flat segment and is considered to be an outlier. The mode segment 606 can be flagged as a potential outlier, notwithstanding the inclusion of non-isolated datapoints within the mode segment 606. In at least some embodiments, the anomaly detection engine 22 can be configured to identify all non-modal points as outliers, or other configurations are contemplated.

In at least some example embodiments, the determination of whether an isolated segment is a flat segment is based on various measured characteristics. FIG. 7B shows various methods of determining various distances between segments or datapoints, which may be used to define flat segment criteria. Distance 708 shows the distance of the flat portion 604 based on the length in the independent axis covered by the constituent datapoints, distance 710 shows a distance the center of the flat portion 604 and the center of the mode segment 602, distance 713 shows the distance between modes, which each distance possibly serving as a proxy or one of a variety of factors to determine the length of the flat portion 604.

Figure 8:
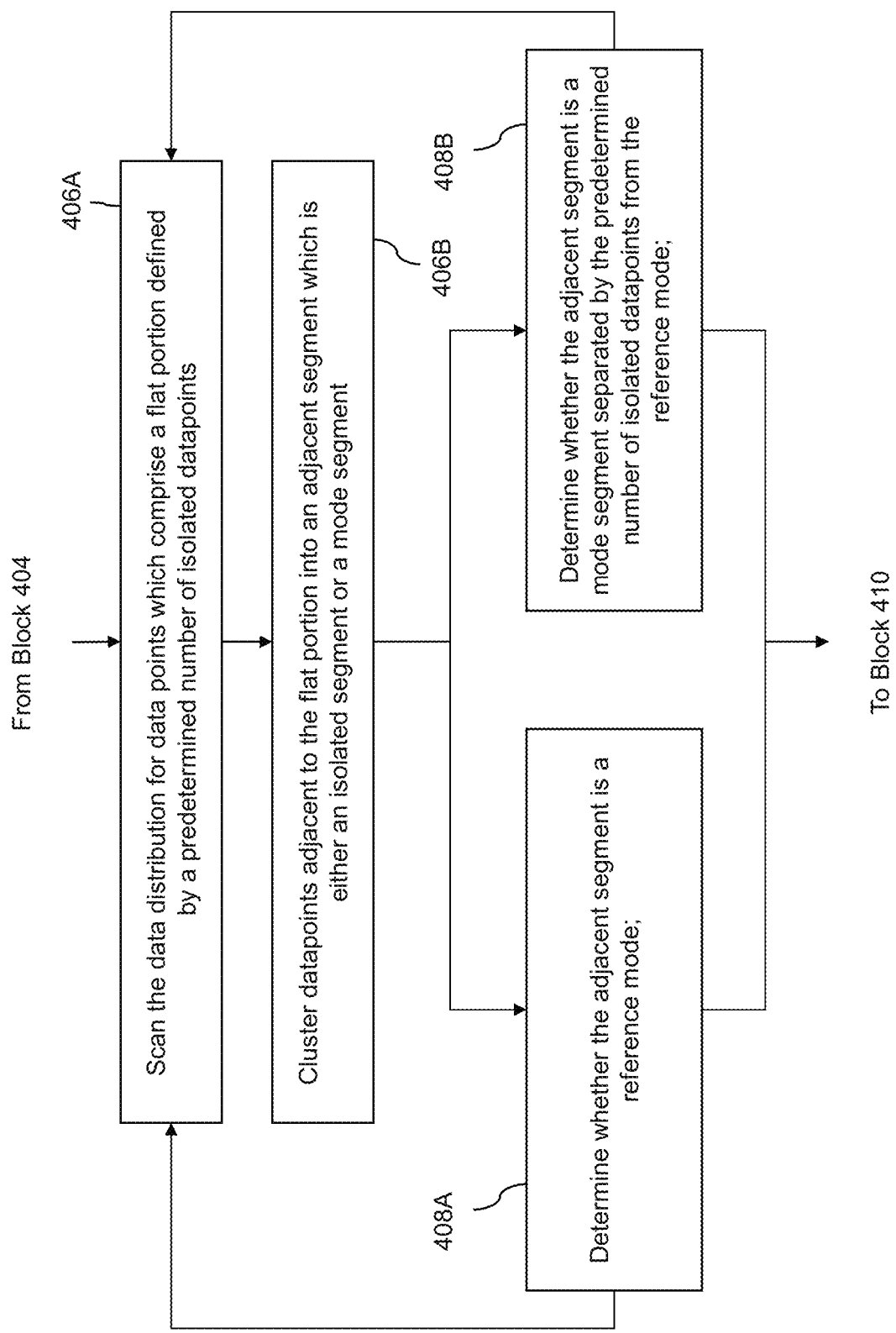
FIG. 8 is a flow diagram illustrating example computer executable instructions for performing certain blocks described in FIG. 4.

In at least one example embodiment, as shown in FIG. 8, in blocks 406 and 408 of FIG. 4 the clustering engine 26 can be pre-configured to consider all datapoints of the obtained distribution as to belonging to a single mode unless a predetermined number of isolated datapoints are found.

At block 406A, the clustering engine 26 can scan the data distribution for datapoints which comprise a flat portion. For example, the flat portion may be identified as discussed in relation to FIGS. 5A and 7A.

At block 406B, the clustering engine 26 can cluster segments adjacent to the identified flat portion in block 406A into either mode or isolated segments. For example, the segments can be identified and clustered as set out above in relation to 5A and 7A.

In at least one example embodiment, the clustering engine 26 may determine there is only one adjacent mode segment in the data distribution based on step 406A and 406B alone. In this embodiment, the clustering engine 26 may determine that all points outside of the mode segment (i.e., the reference segment) are outliers and move directly to block 410 of FIG. 4.

At block 408A, the clustering engine 26 determines whether any identified mode segments (i.e., mode segments adjacent to the flat portion found in block 406A) are reference modes. The mode segment can be defined as a reference mode based on, for example, a similarity to an expected mode defined by mode simulator 28. The mode segment may be defined as a temporary reference mode pending further iterations of identifying adjacent mode segments and flat portions. For example, if only one mode is found on a first iteration of the method shown in FIG. 8, and a second adjacent mode segment is found on a second iteration of searching for flat portions and modes, the second mode may be determined to be the reference.

Figure 9:
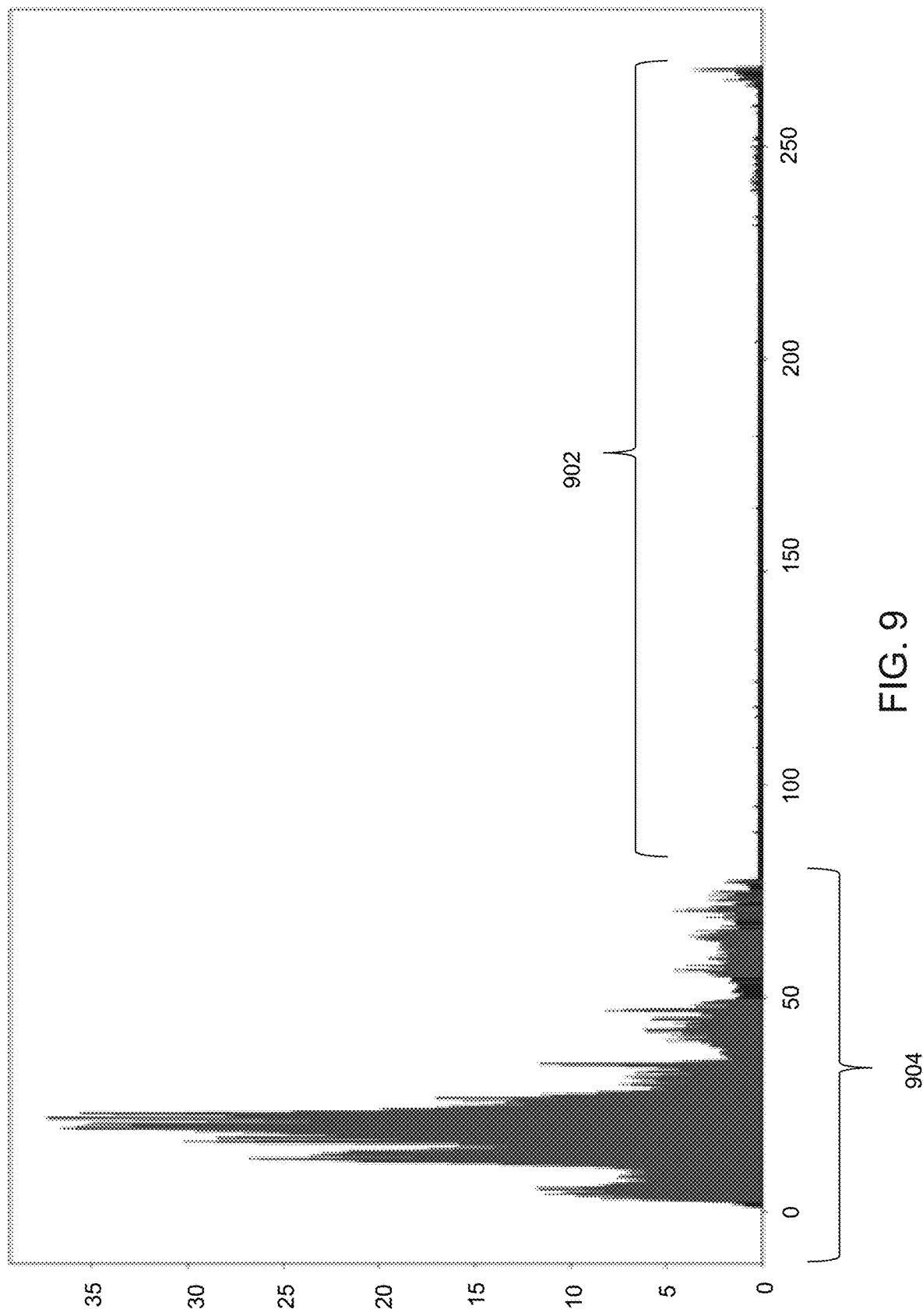
FIGS. 9 and 10 are each a graph of an example data distribution with clustered datapoints.

At block 408B, whether the adjacent segment is a mode segment separated by the predetermined number of isolated datapoints from the reference mode is determined. The adjacent segment may be an isolated segment that is not a flat portion, or the adjacent segment may be a mode segment that is separated from the reference mode by a previously identified isolated segment. Block 408B may be iterated, and a previously identified mode segment that is not separated from a first reference mode may be separated from a final reference mode by the requisite criteria to classify it as an outlier. Referring now to FIG. 9, an example where a single flat portion 902 and a single mode segment 904 is identified in an example data distribution based on the method shown in FIG. 8 is shown.

Figure 10:
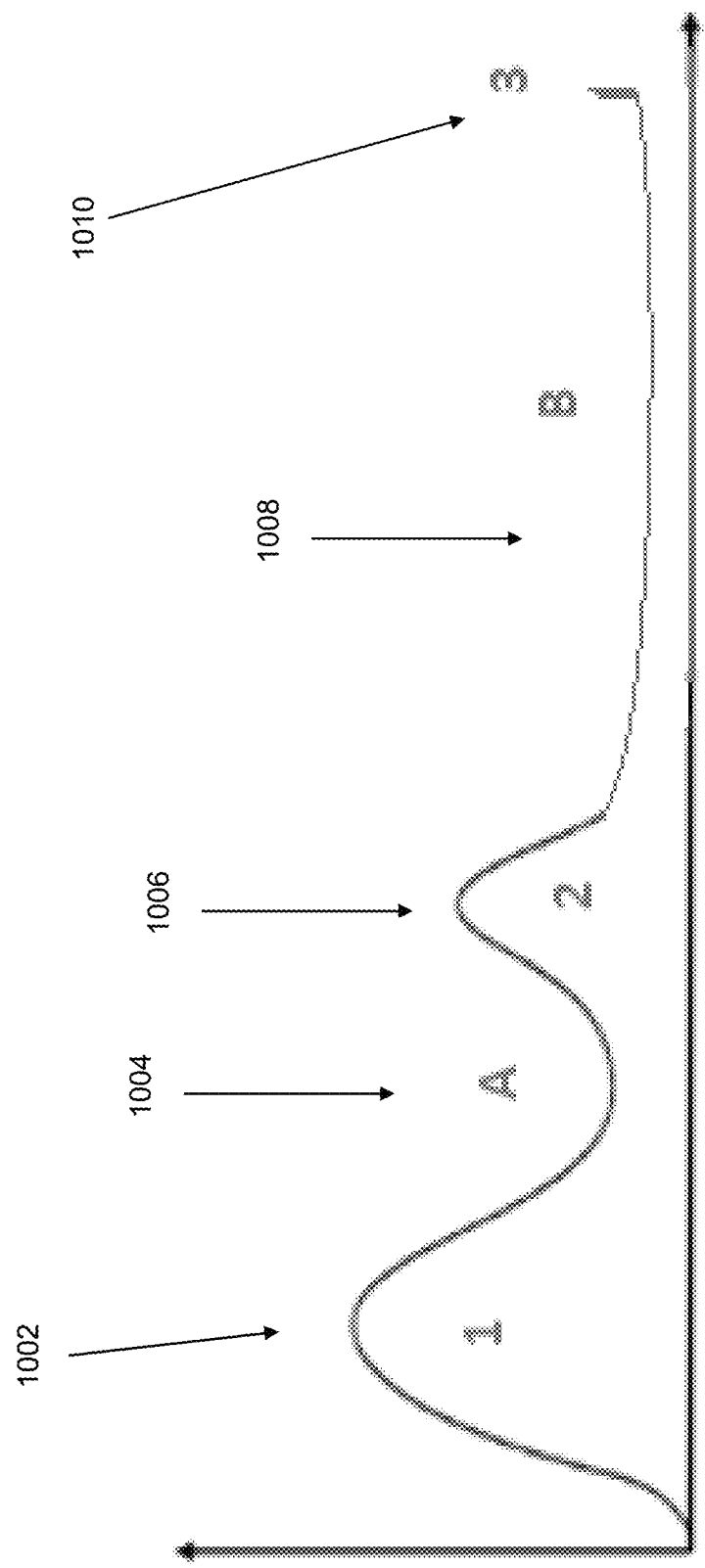

In example embodiments, the method shown in FIG. 8 may in part be reversed; that is, mode segments may be detected, and adjacent segments are evaluated to determine whether they are flat segments or isolated segments. An example of the outcome of such a method is shown in FIG. 10, whereby first the mode 1002 was identified (also shown denoted by number 1), and the adjacent segment 1004 (also shown denoted by letter A) was identified as an isolated segment and not a flat portion, after which the second mode 1006 (also shown denoted by number 2) was identified. Adjacent to mode 1006 is flat portion 1008 (also shown denoted by letter B). A further potential mode 1010 (also shown denoted by number 3, representing the third mode) is identified. Because the mode 1010 is separated by the predetermined number of isolated datapoints from mode 1006, in this instance it is classified as an outlier. Notably, modes 1002 and 1006 are not separated by the predetermined number of isolated datapoints separate, and therefore neither node is identified as an outlier.

Referring again to FIG. 8, once the clustering engine 26 cannot find further segments, or where the entire distribution has been scanned, the process may proceed to block 410 in FIG. 4. At block 410, the anomaly detection engine 22 or application 20 implements an action based on the identified outliers. The action can include sending a notification to a data analyst associated with the enterprise system 16 or providing an output to a monitoring system 40 (FIG. 2), or the analyst may access the enterprise system via the monitoring system 40.

The action can include initiating a fraud or security breach protocol for an account associated with the outliers. For example, referring again to FIG. 7B, the data associated with the branches which are included in the flat region 706 may be entered into a heightened fraud or security state, where new account openings are required to be more heavily scrutinized. In at least one embodiment, the fraud or security breach protocol requires that further information is obtained for events classified as or associated with the determined outliers. Continuing the example, new account opening protocols in the outlier branches can require additional confirmation of identity. In some embodiments, the analyst reviews the notification provided by the system in step 410, and thereafter determines the appropriate additional protocol to be implemented in outlier circumstances. The new protocol may also be shared enterprise wide, to prevent for example a fraudulent technique from travelling through various outputs of the enterprise.

Figure 11:
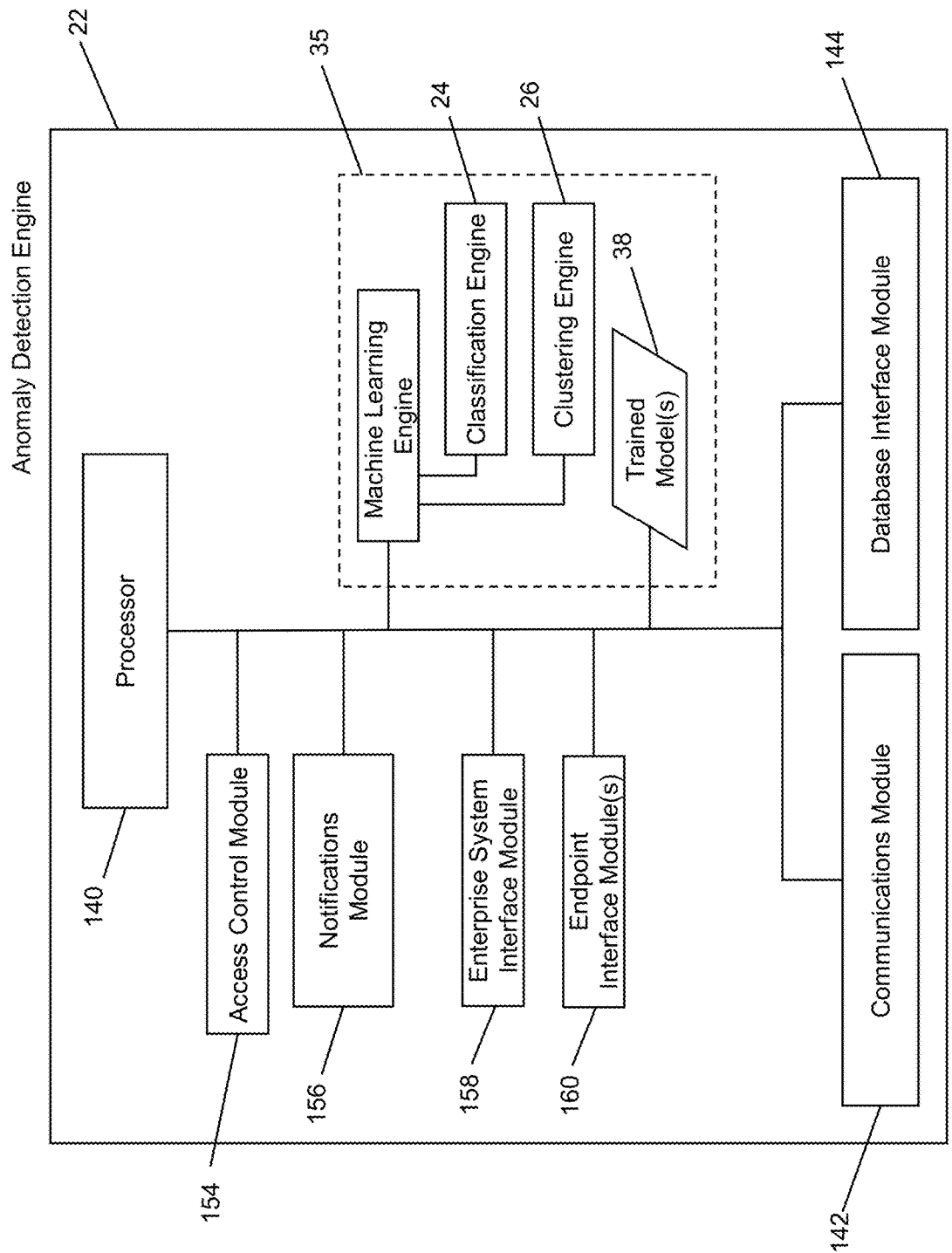
FIG. 11 is a block diagram of an example configuration of an anomaly detection engine.

In FIG. 11, an example configuration of the anomaly detection engine 22 is shown. In at least one embodiment, the anomaly detection engine 22 may include one or more processors 140, a communications module, 142, and a database interface module 144 for interfacing with the databases 30, 32, 24, or 36, to retrieve, modify, and store (e.g., add) data. The anomaly detection engine 22 can be embodied as one or more server devices and/or other computing device(s) configured to operate within computing environment 8. Communications module 142 enables the anomaly detection engine 22 to communicate with one or more other components of the computing environment 8, such as client device 12 (or one of its components), application server 18, etc., via a bus or other communication network, such as the communication network 14. While not delineated in FIG. 11, the anomaly detection engine 22 includes at least one memory or memory device, that can include a tangible and non-transitory computer-readable medium having stored therein computer programs, sets of instructions, code, or data to be executed by processor 140. FIG. 11 illustrates examples of modules, tools and engines stored in memory on the anomaly detection engine 22 and operated by the processor 140. It can be appreciated that any of the modules, tools, and engines shown in FIG. 11 may also be hosted externally and be available, to the anomaly detection engine 22, e.g., via the communications module 142. In the example embodiment shown in FIG. 11, the anomaly detection engine 22 includes the machine learning system 35. The machine learning system 35 in this example includes the clustering engine 26 and the classification engine 24. The machine learning system 35 can also include a training module 152 for training models (e.g., models 38), and the trained model 38. The anomaly detection engine 22 also includes an access control module 154, a notifications module 156, an enterprise system interface module 158, and one or more client interface modules 160.

The trained model 38 may also be created, stored, refined, updated, re-trained, and referenced by the anomaly detection engine 22 and/or enterprise system 16 to determine associations between users, transactions, interactions, conversations, third party data, or other contextual content. Such associations can be used to determine whether a particular data distribution is expected to reflect a normal distribution, a student's t distribution, or to assist in training the model to determine mode or isolated segments when said data is properly labelled.

In some instances, classification data stored in the classification database 32, or clustering data stored on clustering database 30, may identify one or more parameters, e.g., "classification" or "clustering" parameters, that facilitate a classification or clustering of datapoints based on any of the exemplary machine learning algorithms or processes described herein. The one or more classification or clustering parameters may correspond to parameters that can indicate an affinity or compatibility between the data in database 36 and certain potential actions (e.g., suggesting certain breach protocols).

In some instances, the additional, or alternate, machine learning algorithms may include one or more adaptive, NLP algorithms capable of parsing each of the classified or clustered portions of the data distribution and predicting a most effective action by the network. For example, the algorithms may determine that an additional verification screen or a changing of screen sequence can be used to reduce unauthorized access or likely generate further data to better understand the outlier. Examples of the adaptive, NLP algorithms include, but are not limited to, NLP models that leverage machine learning processes or artificial neural network processes, such as a named entity recognition model implemented using a SpaCy® library.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more activation types or node configurations, such as a long short term memory (LSTM).

Referring again to FIG. 11, the access control module 154 may be used to apply a hierarchy of permission levels or otherwise apply predetermined criteria to determine what client data on enterprise database 36 can be shared with which entity in the computing environment 8. For example, the anomaly detection engine 22 may have been granted access to certain sensitive client data or financial data for a user, which is associated with a certain client device 12 in the computing environment 8. Similarly, certain client profile data stored in the enterprise database 36 may include potentially sensitive information such as age, date of birth, or nationality, which may not necessarily be needed by the anomaly detection engine 22 to execute certain actions. As such, the access control module 154 can be used to control the sharing of certain client profile data or other client data and/or content stored in the enterprise database 36 and/or other data based on a type of client/user, including financial data, a permission or preference, or any other restriction imposed by the computing environment 8 or application 20 in which the anomaly detection engine 22 is used.

The anomaly detection engine 22 may also include the notifications module 156 configured to send the alerts or notifications via appropriate channels via the application server 18, based on actions determined appropriate by the anomaly detection engine 22, and as further description in relation to step 410 of FIG. 4 The anomaly detection engine 22 may also include one or more client device interface modules 160 to enable the anomaly detection engine 22 to integrate with and communicate with the client devices 12 as discussed above. The interface module(s) 160 can take the form of an application programming interface (API), software development kit (SDK) or any other software, plug-in, agent, or tool that allows the anomaly detection engine 22 to be integrated with or within an application associated with another entity.

The anomaly detection engine 22 may also include an enterprise system interface module 158 to provide a graphical user interface (GUI) or API connectivity to communicate with the enterprise system 16 to obtain client data from enterprise database 36 and financial data for a certain user. It can be appreciated that the enterprise system interface module 158 may also provide a web browser-based interface, an application or "app" interface, a machine language interface, etc.

Figure 12:
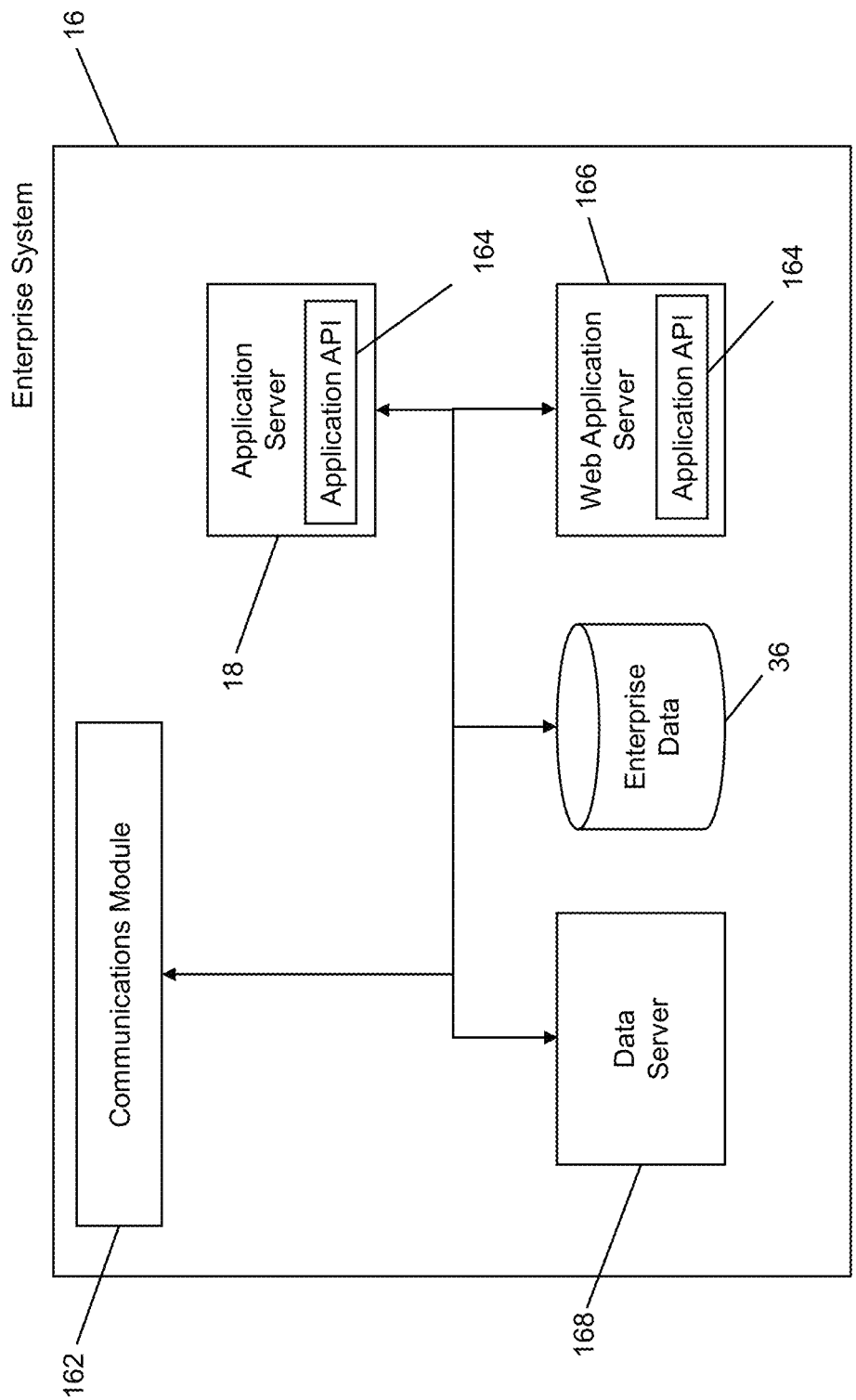
FIG. 12 is a block diagram of an example configuration of an enterprise system.

In FIG. 12, an example configuration of the enterprise system 16 is shown. The enterprise system 16 includes a communications module 162 that enables the enterprise system 16 to communicate with one or more other components of the computing environment 8, such as client device 12 (or one of its components) or anomaly detection engine 22, via a bus or other communication network, such as the communication network 14. While not delineated in FIG. 12, the system 16 includes at least one memory or memory device that can include a tangible and non-transitory computer-readable medium having stored therein computer programs, sets of instructions, code, or data to be executed by one or more processors (not shown for clarity of illustration). FIG. 12 illustrates examples of servers and datastores/databases operable within the system 16. It can be appreciated that any of the components shown in FIG. 12 may also be hosted externally and be available, to the system 16, e.g., via the communications module 162. In the example embodiment shown in FIG. 12, the enterprise system 16 includes one or more servers to provide access to the client data and/or application data stored in the respective database to the anomaly detection engine 22 to monitoring or assessing of user interaction with application 20. Exemplary servers include the application server 18, a web application server 166 and a data server 168. Although not shown in FIG. 12, as noted above, the system 16 may also include a cryptographic server for performing cryptographic operations and providing cryptographic services. The cryptographic server can also be configured to communicate and operate with a cryptographic infrastructure. The enterprise system 16 may also include one or more data storages for storing and providing data for use in such services, such as data storage for storing application data and/or client data.

Application server 18 supports interactions with the application 20 installed on client device 12, whether the client device 12 is within or external to enterprise system 16. Application server 18 can access other resources of the enterprise system 16 to carry out requests made by, and to provide content and data to, application 20 on client device 12. In certain example embodiments, application server 18 supports a mobile banking application to provide payments from one or more accounts of user or supports an VPN or other employee access channel to enterprise resources, among other things. As shown in FIG. 12, the application server 18 can include an application API 164 which enables the application 20 to integrate or otherwise coordinate or work with the anomaly detection engine 22 to provide monitoring or anomaly detection. For example, the API 164 can communicate with the anomaly detection engine 22 via the enterprise system integration module 158 in the anomaly detection engine 22 (see FIG. 11).

Web application server 166 supports interactions using a website accessed by a web browser application 180 (see FIG. 13) running on the client device 12. It can be appreciated that the application server 18 and the web application server 166 can provide different front ends for the same application, that is, the mobile (app) and web (browser) versions of the same application 20. For example, the enterprise system 16 may provide a banking application that can be accessed via a smartphone or tablet app while also being accessible via a browser on any browser-enabled device.

Figure 13:
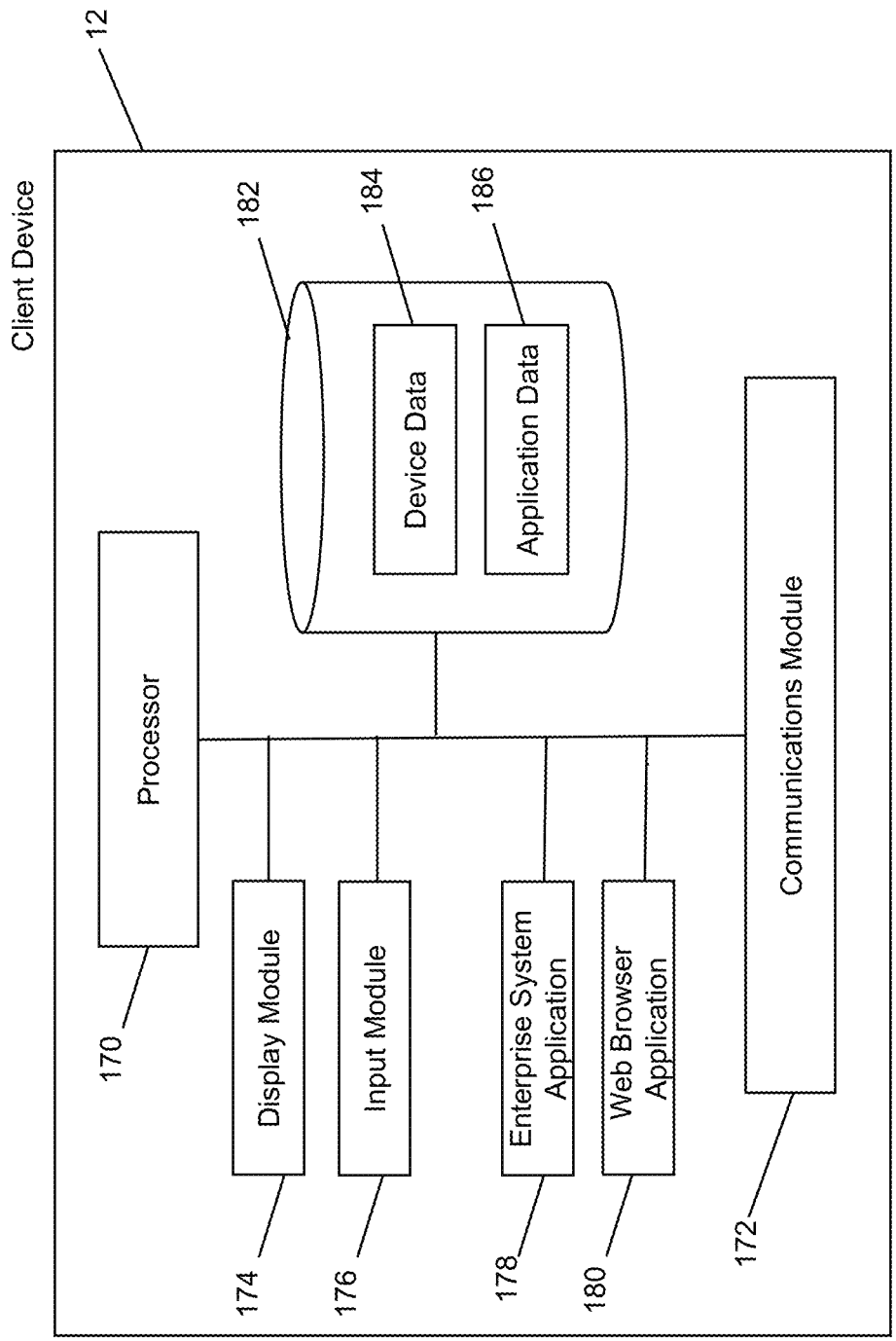
FIG. 13 is a block diagram of an example configuration of a client computing device associated with a user, customer, or client.

In FIG. 13, an example configuration of the client device 12 is shown. In certain embodiments, the client device 12 may include one or more processors 170, a communications module 172, and a data store 182 storing device data 184 and application data 186. Communications module 172 enables the client device 12 to communicate with one or more other components of the computing environment 8, such as anomaly detection engine 22 or enterprise, system 16, via a bus or other communication network, such as the communication network 14. While not delineated in FIG. 13, the client device 12 includes at least one memory or memory device that can include a tangible and non-transitory computer-readable medium having stored therein computer programs, sets of instructions, code, or data to be executed by processor 170. FIG. 13 illustrates examples of modules and applications stored in memory on the client device 12 and operated by the processor 170. It can be appreciated that any of the modules and applications shown in FIG. 13 may also be hosted externally and be available to the client device 12, e.g., via the communications module 172.

In the example embodiment shown in FIG. 13, the client device 12 includes a display module 174 for rendering GUIs and other visual outputs on a display device such as a display screen, and an input module 176 for processing user or other inputs received at the client device 12, e.g., via a touchscreen, input button, transceiver, microphone, keyboard, etc. As noted above, the client device 12 can use such an input module 176 to gather inputs that are indicative of behavioral cues, facial recognition, presence detection, etc. The client device 12 may include an enterprise system application 178 provided by the enterprise system 16. e.g., for performing customer or employee operations and can be or be associated with the application 20 described herein. The client device 12 in this example embodiment also includes a web browser application 180 for accessing Internet-based content, e.g., via a mobile or traditional website. The data store 182 may be used to store device data 184, such as, but not limited to, an IP address or a MAC address that uniquely identifies client device 12 within environment 8. The data store 182 may also be used to store application data 186, such as, but not limited to, login credentials, user preferences, cryptographic data (e.g., cryptographic keys), etc.

It will be appreciated that only certain modules, applications, tools, and engines are shown in FIGS. 3 and 11 to 13 for ease of illustration and various other components would be provided and utilized by the anomaly detection engine 22, enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in anomaly detection engine 22, monitoring system 40, or enterprise system 16, or client device 12, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for detecting anomalous activing based on the data distributions, the system comprising:
    a processor;
    a communications module coupled to the processor; and
    a memory coupled to the processor, the memory storing computer executable instructions that when executed by the processor cause the processor to:
        obtain a plurality of datapoints via the communication module, the datapoints defining a data distribution, each of the datapoints being representative of either: i) a frequency of one or more monitored phenomena, or ii) a time associated with particular frequencies of the monitored phenomena occurring;
        classify the plurality of datapoints as isolated or non-isolated datapoints;
        cluster all of the datapoints into one or more segments, the one or more segments including at least some of the non-isolated datapoints clustered into at least one mode segment and/or isolated segments;
        identify a reference mode from the at least one mode segment;
        identify at least one outlier, each outlier being either an isolated or non-isolated datapoint separated along the data distribution from the reference mode by at least a predetermined number of isolated datapoints that, in the data distribution, create a flat portion between the reference mode and the outlier, wherein determining if one or more of the isolated or non-isolated points is separated from the reference mode segment by the predetermined number of isolated datapoints creating the flat portion, further causes the processor to determine whether the isolated segments include the predetermined number of isolated datapoints creating the flat portion; and
        initiate an action based on the identified at least one outlier.

2. The system of claim 1, wherein the action comprises sending a notification to a data analyst via the communication module.

3. The system of claim 1, wherein the action comprises providing an output to a monitoring system via the communications module.

4. The system of claim 3, wherein the action comprises initiating a fraud or security breach protocol for an account associated with the outliers.

5. The system of claim 1, wherein the segments are clustered using one of k-means, Jenks Natural Breaks Optimization, or Kernel Density Estimation.

6. The system of claim 1, wherein:
    the at least some of the non-isolated datapoints are clustered into at least two mode segments; and
    the computer executable instructions further cause the processor to:
        determine if a further mode segment of the at least two mode segments is separated from the reference mode by the predetermined number of isolated datapoints.

7. The system of claim 1, wherein the data distribution is a histogram, each of the datapoints comprises a bar of the histogram, and the frequency or the particular frequencies of the monitored phenomena denote frequencies of accessing a bank account or an employee terminal.

8. The system of claim 1, wherein datapoints are classified into isolated or non-isolated datapoints based on their proximity to one another.

9. The system of claim 8, wherein the datapoints are classified using a local outlier factor (LOF) technique.

10. A method for detecting anomalous activity based on data distributions, the method comprising:
    obtaining a plurality of datapoints, the datapoints defining a data distribution, each of the datapoints being representative of either: i) a frequency of one or more monitored phenomena, or ii) a time associated with particular frequencies of the monitored phenomena occurring;
    classifying the plurality of datapoints as isolated or non-isolated datapoints; clustering all of the datapoints into one or more segments, the one or more segments including at least some of the non-isolated datapoints clustered into at least one mode segment and/or isolated segments;
    identifying a reference mode from the at least one mode segment;
    identifying at least one outlier, each outlier being either an isolated or non-isolated datapoint separated along the data distribution from the reference mode by at least a predetermined number of isolated datapoints that, in the data distribution, create a flat portion between the reference mode and the outlier, wherein determining if one or more of the isolated or non-isolated points is separated from the reference mode segment by the predetermined number of isolated datapoints creating the flat portion, further causes the processor to determine whether the isolated segments include the predetermined number of isolated datapoints creating the flat portion; and
    initiating an action based on the identified at least one outlier.

11. The method of claim 10, wherein the action comprises sending a notification to a data analyst.

12. The method of claim 10, wherein the action comprises providing an output to a monitoring system.

13. The method of claim 12, wherein the action comprises initiating a fraud or security breach protocol for an account associated with the outliers.

14. The method of claim 10, wherein the segments are clustered using one of k-means, Jenks Natural Breaks Optimization, or Kernel Density Estimation.

15. The method of claim 10, wherein:
    the at least some of the non-isolated datapoints are clustered into at least two mode segments; and
    the method further comprises determining if a further mode segment of the at least two mode segments is separated from the reference mode by the predetermined number of isolated datapoints.

16. The method of claim 10, wherein the data distribution is a histogram, each of the datapoints comprises a bar of the histogram, and the frequency or the particular frequencies of the monitored phenomena denote frequencies of accessing a bank account or an employee terminal.

17. The method of claim 10, wherein datapoints are classified into isolated or non-isolated datapoints based on their proximity to one another.

18. A non-transitory computer readable medium for detecting anomalous activity based on data distributions, the computer readable medium comprising computer executable instructions for:

- obtaining a plurality of datapoints, the datapoints defining a data distribution, each of the datapoints being representative of either: i) a frequency of one or more monitored phenomena, or ii) a time associated with particular frequencies of the monitored phenomena occurring;
- classifying the plurality of datapoints as isolated or non-isolated datapoints; clustering all of the datapoints into one or more segments, the one or more segments including at least some of the non-isolated datapoints clustered into at least one mode segment and/or isolated segments;
- identifying a reference mode from the at least one mode segment;
- identifying at least one outlier, each outlier being either an isolated or non-isolated datapoint separated along the data distribution from the reference mode by at least a predetermined number of isolated datapoints that, in the data distribution, create a flat portion between the reference mode and the outlier, wherein determining if one or more of the isolated or non-isolated points is separated from the reference mode segment by the predetermined number of isolated datapoints creating the flat portion, further causes the processor to determine whether the isolated segments include the predetermined number of isolated datapoints creating the flat portion; and
- initiating an action based on the identified at least one outlier.

* * * * *